US011617250B2

(12) United States Patent
Xia

(10) Patent No.: US 11,617,250 B2
(45) Date of Patent: Mar. 28, 2023

(54) ILLUMINATION CONTROL SYSTEM AND METHOD, AND ILLUMINATION DEVICE

(71) Applicant: OPPLE LIGHTING CO., LTD., Shanghai (CN)

(72) Inventor: Jianming Xia, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 289 days.

(21) Appl. No.: 17/014,029

(22) Filed: Sep. 8, 2020

(65) Prior Publication Data
US 2021/0007205 A1 Jan. 7, 2021

Related U.S. Application Data

(63) Continuation of application No. PCT/CN2019/077187, filed on Mar. 6, 2019.

(30) Foreign Application Priority Data

Mar. 6, 2018 (CN) .......................... 201810183463.4
Mar. 6, 2018 (CN) .......................... 201820309525.7

(51) Int. Cl.
*H05B 47/11* (2020.01)
*H05B 47/19* (2020.01)
(Continued)

(52) U.S. Cl.
CPC ............. *H05B 47/11* (2020.01); *H05B 47/10* (2020.01); *H05B 47/155* (2020.01); *H05B 47/19* (2020.01); *H05B 47/17* (2020.01)

(58) Field of Classification Search
CPC ...... H05B 47/11; H05B 47/10; H05B 47/155; H05B 47/19; H05B 47/17; Y02B 20/40
See application file for complete search history.

(56) References Cited

U.S. PATENT DOCUMENTS 9,441,979 B2 9/2016 Barnard et al.
9,746,333 B2 8/2017 Barnard et al.
(Continued)

FOREIGN PATENT DOCUMENTS

CN 102056374 A 11/2011
CN 105007665 A 10/2015
(Continued)

OTHER PUBLICATIONS

Machine Translation of WO2019080123A1 (Year: 2019).*
(Continued)

*Primary Examiner* — Raymond R Chai
(74) *Attorney, Agent, or Firm* — Arch & Lake LLP

(57) ABSTRACT

An illumination control system and method and an illumination device are provided. The illumination control system includes a plurality of illumination nodes which are capable of communicating with each other. The illumination node is provided therein with a wireless master control apparatus, a drive apparatus connected with the wireless master control apparatus, and at least one illumination unit controlled by the drive apparatus. The wireless master control apparatus is configured to detect a brightness of a current environment; define an illumination scenario for the illumination node; adjust an output parameter of the drive apparatus in the illumination node according to the brightness and the illumination scenario; and send a lighting instruction to a remaining illumination node of the illumination control system. The wireless master control apparatus is further configured to receive the lighting instruction.

20 Claims, 5 Drawing Sheets

(51) Int. Cl.
  *H05B 47/155*  (2020.01)
  *H05B 47/10*  (2020.01)
  *H05B 47/17*  (2020.01)

(56) References Cited

U.S. PATENT DOCUMENTS

| | | | |
|---|---|---|---|
| 9,927,249 B2 | 3/2018 | Barnard et al. | |
| 11,417,203 B2* | 8/2022 | Newman, Jr. | H05B 47/105 |
| 2007/0058700 A1* | 3/2007 | Fenton | H04B 1/7075 |
| | | | 375/150 |
| 2011/0025469 A1* | 2/2011 | Erdmann | H04L 12/2809 |
| | | | 340/10.1 |
| 2011/0026434 A1* | 2/2011 | Van Der Stok | G01S 5/0289 |
| | | | 370/254 |
| 2015/0008831 A1* | 1/2015 | Carrigan | H05B 45/22 |
| | | | 315/153 |
| 2015/0181678 A1 | 6/2015 | Sachs et al. | |
| 2015/0373482 A1 | 12/2015 | Barnard et al. | |
| 2017/0150584 A1* | 5/2017 | Motley | H05B 47/19 |
| 2018/0317306 A1* | 11/2018 | Harris | F21V 7/0008 |
| 2019/0254141 A1* | 8/2019 | Lal | F21V 29/70 |
| 2020/0146133 A1* | 5/2020 | Baus | G06F 3/0482 |

FOREIGN PATENT DOCUMENTS

| | | |
|---|---|---|
| CN | 107155407 A | 9/2017 |
| CN | 106658909 A | 10/2017 |
| CN | 108419344 A | 8/2018 |
| CN | 208143552 U | 11/2018 |
| WO | WO-2019080123 A1 * 5/2019 | ......... G05B 13/0265 |

OTHER PUBLICATIONS

International Search Report of PCT Application No. PCT/CN2019/077187 dated May 15, 2019 with English translation, (6p).

\* cited by examiner

ILLUMINATION CONTROL SYSTEM AND METHOD, AND ILLUMINATION DEVICE

CROSS-REFERENCE TO RELATED APPLICATIONS

This application is based upon and claims the priority of PCT patent application No. PCT/CN2019/077187 filed on Mar. 6, 2019 which claims priority to the Chinese patent application No. 201820309525.7 filed on Mar. 6, 2018 and the Chinese patent application No. 201810183463.4 filed on Mar. 6, 2018, the entire content of all of which is hereby incorporated by reference herein for all purposes.

TECHNICAL FIELD

The present disclosure relates to the field of illumination technology, in particular to an illumination control system and method and an illumination device.

BACKGROUND

With its development, the intelligent control technology may be applied in industrial, commercial and civil lighting environments, such as shopping malls, landscape lamps, indoor illumination, or the like. In actual use, a sensor is controlled separately from an illumination module, a region where several illumination apparatuses are located is controlled by a single sensor, and thus a change in the area where each illumination apparatus is located may not be precisely sensed.

SUMMARY

The present disclosure provides an illumination control system and method, and an illumination device.

According to a first aspect of the present disclosure, an illumination control system is provided. The system may include a plurality of illumination nodes which are capable of communicating with each other, where the illumination node is provided therein with a wireless master control apparatus, a drive apparatus connected with the wireless master control apparatus, and at least one illumination unit controlled by the drive apparatus.

The wireless master control apparatus may be configured to detect a brightness of a current environment in a case where the wireless master control apparatus senses that a user exists within a specified range from the illumination node to which the wireless master control apparatus belongs.

The wireless master control apparatus may be further configured to: define an illumination scenario for the illumination node to which the wireless master control apparatus belongs based on an environmental attribute of the illumination node; adjust an output parameter of the drive apparatus in the illumination node according to the brightness and the illumination scenario currently defined for the illumination node to control an illumination brightness of the illumination unit; and send a lighting instruction to a remaining illumination node of the illumination control system.

The wireless master control apparatus may be further configured to receive a lighting instruction sent by a remaining illumination node in the illumination control system to the illumination node to which the wireless master control apparatus belongs, and adjust an illumination brightness of the illumination node according to the lighting instruction.

According to another aspect of the present disclosure, an illumination device is provided. The device may include a wireless master control apparatus, a drive apparatus connected with the wireless master control apparatus, and at least one illumination unit controlled by the drive apparatus; where the wireless master control apparatus may be configured to adjust an output parameter of the drive apparatus in the illumination node to which the wireless master control apparatus belongs according to environment information within a specific range, and control an illumination brightness of the illumination unit controlled by the drive apparatus.

According to a further aspect of the present disclosure, an illumination control method is provided. The method may be adapted for an illumination control system provided with a plurality of illumination nodes capable of communicating with each other, where the illumination node may include a wireless master control apparatus.

The method may include: detecting a brightness of a current environment in a case where the wireless master control apparatus in any illumination node in the illumination control system senses that a user exists in a specified range from the illumination node to which the wireless master control apparatus belongs; defining an illumination scenario for the illumination node based on an environmental attribute of the illumination node, adjusting an illumination brightness of the illumination node according to the brightness and the illumination scenario currently defined for the illumination node, and sending a lighting instruction to a remaining illumination node of the illumination control system; and in a case where the wireless master control apparatus receives a lighting instruction sent by a remaining illumination node in the illumination control system to the illumination node to which the wireless master control apparatus belongs, adjusting the illumination brightness of the illumination node according to the lighting instruction.

It is to be understood that both the foregoing general description and the following detailed description are exemplary and explanatory only and are not restrictive of the present disclosure.

BRIEF DESCRIPTION OF THE DRAWINGS

Various additional advantages and benefits will become apparent to those of ordinary skill in the art upon reading the following detailed description of the examples. The drawings are provided merely for purposes of illustrating the examples and are not to be construed as limiting the present disclosure. Like reference numerals are used to denote like parts throughout the drawings. In the drawings.

DETAILED DESCRIPTION

Figure 1:
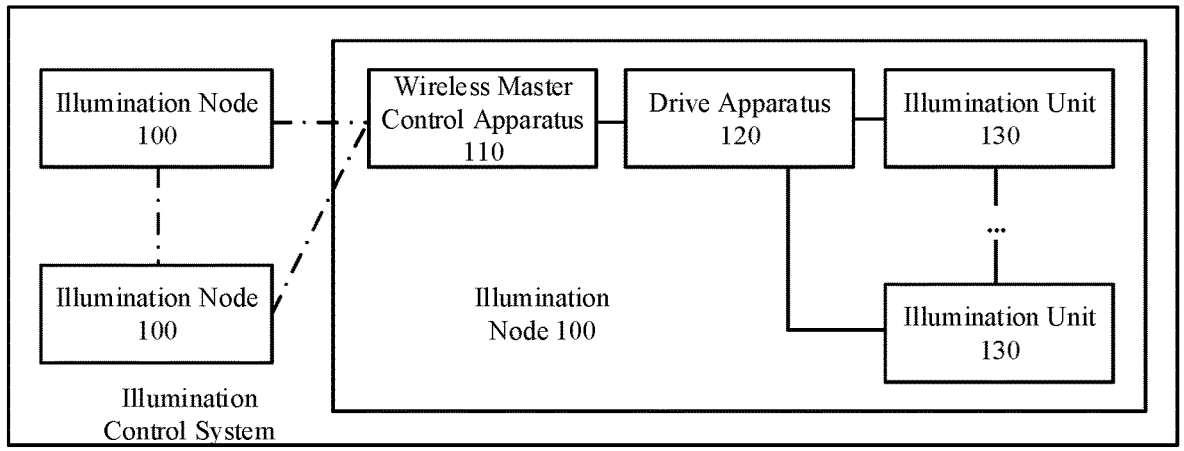
FIG. 1 is a schematic structural diagram of an illumination control system according to an example of the present disclosure.

Examples of the present disclosure will be described in more detail below with reference to the accompanying drawings. While examples of the present disclosure are shown in the drawings, it should be understood that the present disclosure may be embodied in various forms and should not be limited by the examples set forth herein. Rather, these examples are provided to enable a more thorough understanding of the present disclosure, and will fully convey the scope of the disclosure to those skilled in the art.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

When a plurality of illumination nodes is controlled by a master controller, the illumination difference between different nodes can be noticed. In addition, an illumination deployment region is characterized by complexity, illumination requirements vary depending on regions, some control technologies may not meet the requirements of different illumination regions, and illumination effects sometimes may not meet user's requirements.

With the development of the intelligent control technology, the illumination function of an illumination apparatus is extended to the wireless direction. For example, the illumination apparatus may be switched on and off at fixed time, and the switching time of a lamp may be flexibly adjusted according to seasons; the illumination apparatus has an intelligent characteristic, and may be automatically switched on in some special weather situations (such as rainstorm and cloudy days) in conjunction with the illumination sensor technology; the illumination apparatus has adjustable light, may be automatically adjusted to the maximum illuminance in case of a large pedestrian flow, and may automatically dim when the pedestrian flow is sparse or nobody exists.

With an intelligent illumination control system including the intelligent controllable illumination apparatus, lamps therein may have an illumination effect which is more attractive and illumination which is more intelligent, and light management is more scientific. The illumination system may be controlled with various methods intelligently, but in most of the methods, the illumination apparatuses are controlled independently without negotiation, and therefore, the overall illumination control effect of the illumination system is uneven.

In an illumination control system, a sensor is controlled separately from an illumination module, so that a change of the area where each illumination apparatus is located is unable to be controlled accurately. For example, an illuminance sensor is deployed near a window to control a row of illumination lamp panels nearby; however, although the sensor is deployed at a position to control illumination positions of the same light as much as possible, the more the illumination apparatuses are controlled, the more obvious the illumination difference between different apparatuses becomes, which is the worst experience in practical applications. A movement sensor may only respond when a person arrives at the position of the sensor, and generally, the controlled illumination apparatus has a range much greater than a sensing range of the sensor, so that the sensor is unable to respond in time, the control region has no better light hierarchical control, and the comfort level and the energy-saving effect are required to be further improved.

An illumination deployment region is characterized by complexity, such as a passageway, a corridor, a toilet, a front desk, or the like, scenario-specific processing which is controlled intelligently is often complex relatively, and different regions have different illumination requirements and different energy-saving targets.

In view of the above-mentioned problems, an example of the present disclosure provides an illumination control system. FIG. 1 is a schematic structural diagram of an illumination control system according to an example of the present disclosure, and as shown in FIG. 1, the intelligent control system according to the example of the present disclosure may include a plurality of illumination nodes 100 which may communicate with each other, and the illumination node may be provided therein with a wireless master control apparatus 110, a drive apparatus 120 connected with the wireless master control apparatus 110, and at least one illumination unit 130 controlled by the drive apparatus 120. The wireless master control apparatus 110 is configured to detect the brightness of a current environment when sensing that a user exists within a specified range from the illumination node to which the wireless master control apparatus belongs; the wireless master control apparatus 110 may further be configured to define an illumination scenario for the illumination node based on environmental attributes of the illumination node, adjust output parameters of the drive apparatus 120 in the illumination node according to the brightness of the current environment and the illumination scenario defined currently for the illumination node, control the illumination brightness of the illumination unit 130, and send a lighting instruction to other illumination nodes of the illumination control system. The output parameters of the drive apparatus 120 may be the brightness, the color temperature, etc., of the illumination unit.

Preferably, at least one illumination scenario may be preset in the wireless master control apparatus 110, and when the illumination scenario is defined for the illumination node to which the wireless master control apparatus belongs, one of the above-mentioned at least one illumination scenario may be selected based on the environmental attributes of the illumination node as the illumination scenario thereof. For example, the illumination node may be provided in a living room, the passageway, the corridor, the toilet, the front desk, or the like, and different illumination scenarios, such as safe illumination, night illumination, unmanned illumination, passageway illumination, or the like, may be defined for the illumination node according to actual environmental attributes thereof.

Further, the wireless master control apparatus 110 may be further configured to receive the lighting instruction sent by other illumination nodes in the illumination control system to the illumination node to which the wireless master control apparatus 110 belongs, and adjust the illumination brightness of the illumination node according to the lighting instruction.

The example of the present disclosure provides an illumination control system which is more flexible. The wireless master control apparatus 110 is provided in each illumination node 100 of the illumination control system to sense the environment near the illumination node and further adjust the illumination brightness of the illumination node to which the wireless master control apparatus belongs to the optimum illumination state based on the sensing result in combination with the illumination scenario defined currently by the illumination node, and sending the lighting instruction to other illumination modes in the illumination control system. In addition, the wireless master control apparatus 110 may further receive the lighting instruction sent by other illumination nodes to the illumination node, thereby further adjusting the illumination brightness of the illumination node based on the lighting instruction.

In the present example, the illumination nodes 100 in the illumination control system may be configured as illumination devices which work independently and are each provided with the wireless master control apparatus 110, the drive apparatus 120 and the illumination unit 130, such as illumination lamps independently provided in the living room or a bedroom. Each illumination node may also be controlled by one wireless master control apparatus 110 and one drive apparatus 120 and provided with a plurality of illumination units 130; for example, three spotlights at the front desk are controlled by only one switch, so that the three spotlights, as three illumination nodes, may share one wireless master control apparatus and one drive apparatus, and the drive apparatus automatically adapts to the loads of a plurality of LEDs. For example, a ceiling lamp may be provided with the single wireless master control apparatus 110, the single drive apparatus 120 and one or more illumination units 130 controlled by the same drive apparatus, and at this moment, the ceiling lamp may be powered by a battery, or the above-mentioned one or more illumination units 130, configured as spotlights, focus lamps, or the like, may be controlled by a power source through a wire.

The wireless master control apparatus 110 may be configured as a chip simultaneously integrating a wireless propagation function (such as Bluetooth, WiFi, ZigBee, or the like) and a logic processing function (such as a single chip microcomputer). The drive apparatus 120 provides power required for illumination of the entire illumination node 100, and converts a supply voltage into a working voltage required by the illumination node 100. The drive apparatus 120 may be set according to different practical situations, such as a constant current driving situation and a voltage stabilization driving situation, which is not limited in the present disclosure. The drive apparatus 120 in the present example supports the capability of driving a single lamp or plural lamps, and may supply power at 5V to the wireless master control apparatus 110 in practical applications by plugging and pulling R, G, B, W, CW cables.

As introduced above, the wireless master control apparatus 110 may also control the output parameters of the drive apparatus 120 in the illumination node to which the wireless master control apparatus belongs in conjunction with the illumination scenario defined currently for the illumination node. The illumination scenario is related to an actual region where the illumination node is located, such as the passageway, the corridor, the toilet, the front desk, or the like, and different scenario modes are configured in different regions, such as safe illumination, a wall washer light, night illumination, unmanned illumination, passageway illumination, or the like. Preferably, the drive apparatus 120 may automatically adapt to the output load, and may also perform measurement and feedback of a status and an electric quantity, fault detection, or the like. Further, the drive apparatus 120 may also supply power to the wireless master control apparatus 110. The illumination unit 130 may have various forms, and may also be provided therein with a substrate and a light source. When configured as the ceiling lamp, the illumination unit 140 may include a chassis and a cover, and may include a base, a reflector, a face ring, or the like, when configured as a tube spotlight.

In the example of the present disclosure, the whole illumination region involved by the illumination control system may be first divided into a plurality of different illumination subregions according to different region attributes, and after matrix configuration is performed on each illumination subregion, the illumination scenario is defined for each illumination subregion and the illumination node in each illumination subregion.

In addition, as mentioned above, the wireless master control apparatus 110 may further be configured to receive the lighting instruction sent by other illumination nodes in the illumination control system to the illumination node 100 to which the wireless master control apparatus 110 belongs, and adjust the illumination brightness of the illumination node according to the lighting instruction. In practical applications, the lighting instruction may carry information on a controlled target illumination node or a target illumination region, and when the wireless master control apparatus 110 in the controlled illumination node in the system receives the lighting instruction sent by other illumination nodes, the instruction may be analyzed to determine whether the illumination node or the illumination region to which the wireless master control apparatus belongs is consistent with the target illumination node or the target illumination region in the lighting instruction, and when the illumination node or the illumination region is consistent with the target illumination node or the target illumination region, the illumination brightness of the illumination node to which the wireless master control apparatus belongs is adjusted, and preferably, the output parameters of the drive apparatus in the illumination node to which the wireless master control apparatus belongs may be adjusted to further control the illumination brightness of the illumination unit.

Further, the wireless master control apparatus 110 may be further configured to receive a lighting instruction sent by other illumination nodes in the illumination control system to the illumination node to which the wireless master control apparatus does not belong, and forward the lighting instruction. That is, the wireless master control apparatus provided in the illumination node 100 may receive the lighting instruction sent by any other illumination node, judge, after receiving the lighting instruction, whether the received lighting instruction is specific to the illumination node to which the wireless master control apparatus belongs (according to the condition whether the illumination node sending the lighting instruction and the illumination node to which the wireless master control apparatus belongs belong to the same illumination subregion or other conditions), if the received lighting instruction is specific to the illumination node, adjust the illumination brightness of the illumination node according to the lighting instruction, and if the received lighting instruction is not specific to the illumination node, only forward the lighting instruction.

Figure 2:
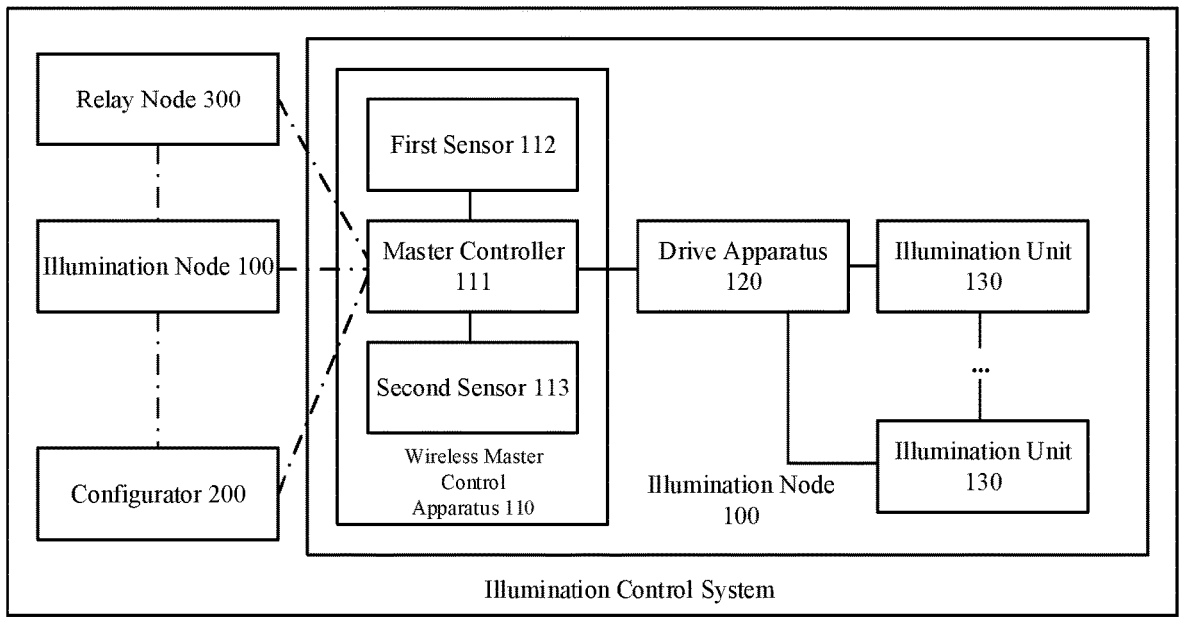
FIG. 2 is a schematic structural diagram of an illumination control system according to an example of the present disclosure.

As shown in FIG. 2, the illumination control system according to the example of the present disclosure may further include a configurator 200 which is provided with a preset matrix diagram and may be wirelessly connected with each illumination node in the illumination control system.

The configurator 200 may be configured to partition the illumination region controlled by the illumination control system and configure a matrix diagram for each illumination subregion. Preferably, the configurator 200 may identify the illumination region of the illumination control system, divide the illumination control system into a plurality of independent illumination subregions according to actual region division after completion of deployment of each illumination node in the illumination control system, select any one of the illumination subregions, establish communication connection with each illumination node in the illumination subregion respectively, deploy each illumination node into the preset matrix diagram according to an actual position of each illumination node, generate a matrix coordinate for each illumination node for recording, confirm whether the matrix coordinate of each illumination node in the illumination subregion is correct or not, and when the matrix coordinate of any illumination node in the illumination subregion is incorrect, reconfigure a matrix coordinate for the illumination node, and after completion of the configuration of the matrix coordinate of each illumination node, transmit the matrix coordinate corresponding to each illumination node to the illumination node. The configurator 200 may be configured as a mobile terminal, or a controller which is connected wirelessly and may be used in cooperation with the illumination control system according to the present example. When the configurator 200 is configured as a mobile terminal, a corresponding application program may be set in the mobile terminal to complete the region division of the illumination control system and the configuration of the illumination scenario.

Specifically, when matrix deployment is performed on each illumination subregion, the configurator 200 may select any illumination subregion, establish communication connection with any illumination node in the illumination subregion, deploy the illumination node into the preset matrix diagram as an origin of matrix coordinates, sequentially establish communication connection with other illumination nodes in the illumination subregion, deploy these illumination nodes into the preset matrix diagram according to actual positions of these illumination nodes, and generate and record matrix coordinates for these illumination nodes. When matrix deployment is performed, the illumination node at a corner may be preferably used as the origin, and distribution of the illumination nodes in each illumination subregion may be learned more intuitively and conveniently. The configurator 200 may transmit the matrix coordinate to each illumination node by wireless technologies, such as Bluetooth, WiFi, ZigBee, or the like.

Further, the configurator 200 is further configured to, after completion of the configuration of the matrix coordinate of each illumination node, generate a matrix diagram with each illumination node in the illumination subregion as a matrix element based on the matrix coordinate of each illumination node in the illumination subregion, and transmit the matrix diagram to each illumination node for storage by the wireless master control apparatus of each illumination node.

By default, each illumination node 100 in the illumination control system is not subjected to matrix configuration after powered on, and therefore, after completion of deployment of each illumination node in the illumination system, a broadcast signal is sent; that is, a notification message is sent to the configurator 200 to notify the configurator of a configured state, so that the configurator 200 performs matrix configuration by means of communication connection with the configurator 200. When performing matrix configuration, the configurator 200 may set an empty two-dimensional matrix in advance, deploy each illumination node according to the actual position of each illumination node, and generate the independent matrix diagram for each illumination subregion. In determining the matrix origin, any illumination node in the illumination subregion may be taken as the origin. Specifically, during deployment, the illumination node at the corner may be preferably used as the matrix origin, and any position in a matrix may be selected as the matrix origin; that is, the origin may be (0,0) or (3,2), which is not limited in the present disclosure.

The matrix diagram of each illumination subregion may be a two-dimensional matrix or a one-dimensional matrix, such as the illumination node of the passageway or corridor. The matrix diagram may also be a single point, such as an independent light source node of an emergency exit, the wall washer light, or the like As introduced above, at least one illumination scenario may be preset in the wireless master control apparatus 110 in the illumination node 100. In addition, the illumination scenario may also be configured for each illumination node by the configurator 200. That is, the configurator 200 may be configured not only to generate the illumination subregions and deploy the matrix diagram for the illumination control system, but also to set one or more illumination scenarios for the illumination node in each illumination subregion based on an attribute function of each illumination subregion and preset scenario control parameters, and assign a scenario number to each illumination scenario.

The illumination scenario may be defined for the illumination subregion according to the attribute function of each illumination subregion. For example, the safe illumination scenario is deployed at the emergency exit; the wall washer light is deployed at a front desk area, or the like; the night illumination scenario corresponds to a region required to be used at night; unmanned illumination corresponds to a storage room, and a lamp is turned on when someone exists, and turned off immediately when nobody exists.

In the illumination control system according to the example of the present disclosure, the configurator 200 may further be configured to set one or more illumination scenarios for the illumination node in each illumination subregion according to the preset scenario control parameters which may include a plurality of brightness levels for each illumination node and the duration of each brightness level.

Different actual environments require different illumination brightnesses. Different brightness levels are set for the illumination nodes, so that different illumination requirements may be met, and the illumination brightness of the illumination node is more comfortable. Certainly, all illumination scenarios may also be preset for the illumination node, and during matrix configuration, one or more illumination scenarios may be selected according to the actual position of the illumination node, which is not limited in the present disclosure.

Preferably, the configurator 200 is further configured to set one or more illumination scenarios for each illumination subregion according to the following scenario control parameters: a maximum brightness level referring to the maximum brightness when a user exists within a specified range from the illumination node; a maximum brightness holding time referring to the holding time of the maximum brightness level when there is a user present; a stable low-brightness level referring to the illumination level which may be kept no matter whether the user exists within the specified range from the illumination node or not; a stable low-brightness holding time referring to the maintaining time before the lamp is turned off completely; and/or a minimum brightness level referring to the minimum brightness when the illumination node does not provide an illumination service.

In an example of the present disclosure, as shown in FIG. 2, the wireless master control apparatus 110 may include a master controller 111, and a first sensor 112 and a second sensor 113 which are connected with the master controller 111.

The first sensor 112 is configured to sense the brightness of the current environment, convert the brightness of the current environment into readable illuminance data, and transmit the readable illuminance data to the master controller 111; the second sensor 113 is configured to transmit a sensing signal to the master controller 111 when sensing that the user exists in the specified range; the master controller 111 is configured to receive the readable illuminance data transmitted by the first sensor 112 and/or the sensing signal transmitted by the second sensor 113, adjust output parameters of the drive apparatus 120 in the illumination node to which the master controller belongs based on the readable illuminance data and/or the sensing signal and the illumination scenario defined currently for the illumination node, and control the illumination brightness of the illumination unit 130 controlled by the drive apparatus 120. The sensing signal transmitted by the second sensor 113 to the master controller 111 may be a level signal. Optionally, the first sensor 112 is preferably configured as an illuminance sensor, and the second sensor 113 is preferably configured as a movement sensor.

The first and second sensors 112, 113 are combined with each illumination node, so that a sensing range may be set for each illumination node, the illumination condition and the user existence condition in the range of each illumination node may be obtained in real time, and the sensor state and data may be precisely processed to control the illumination node. For example, the first sensor 112 only corrects light of the illumination node in which the first sensor 112 is located, so that the region where the illumination node is located may be corrected more precisely. Based on the illumination system according to the example of the present disclosure, each illumination node may be provided therein with the first and second sensor 112, 113, a large-region sensing process is changed into a small-region sensing process, and the control and illumination efficiency of the illumination node may be improved without influencing illumination states of other illumination nodes. Especially, in the daytime, the compensation for each illumination node is different with the angle of natural light varying, and an illumination effect may be more comfortable by adopting a respective processing mode. The second sensor 113 may respond to the existence of the user in the region in time, so as to realize hierarchical light control according to the position of the user. In the present example, the illumination node may be in various forms, such as a tube lamp, a spotlight, a ceiling lamp, or the like. One illumination node may be provided therein with one illumination unit or a plurality of illumination units, such as 2-6 spotlights, projector lamps, or the like, which is not limited in the present disclosure.

The second sensor 113 may be connected with the master controller 111 by a general expander GPIO or in other manners. The master controller 111 in each illumination node may be integrated with a wireless communication device, perform wireless communication using technologies, such as Bluetooth, WiFi, ZigBee, or the like, and may be configured as a combo chip with functions of wireless communication, logic computation, or the like, such as a single chip microcomputer with a wireless communication function, or the like.

In the illumination control system according to the example of the present disclosure, the master controller 111 is further configured to send the lighting instruction to other illumination nodes of the illumination control system when receiving the user-existence sensing signal transmitted by the second sensor 113, and the lighting instruction carries the matrix coordinate of the illumination node 100 to which the master controller 111 belongs. In the illumination control system according to the example of the present disclosure, the illumination nodes may be interconnected, and any illumination node in the illumination control system may send the lighting instruction to other illumination nodes to perform cooperative illumination when sensing that the user exists in the specified range, so that a better illumination service is provided for the user.

Further, the master controller 111 may be further configured to, after receiving the lighting instruction sent by a remaining illumination node, obtain the matrix coordinate of the illumination node sending the lighting instruction; when judging that the illumination node sending the lighting instruction and the illumination node to which the master controller belongs belong to the same illumination subregion, calculate a distance between the illumination node sending the lighting instruction and the illumination node to which the master controller belongs; based on the distance and the illumination scenario defined currently for the illumination node to which the master controller belongs, calculate the required brightness level of the illumination node; adjust the output parameters of the drive apparatus 120 in the wireless master control apparatus of the illumination node to which the master controller belongs based on the brightness level; and control the illumination brightness of the illumination unit 130 controlled by the drive apparatus 120. In practical applications, when more than one illumination node is required to be controlled, each control command includes a node coordinate of a two-dimensional matrix to calculate a relative distance, and automatic hierarchical control of the illumination node is performed according to the distance, which saves more energy and realizes higher intelligentization.

When a plurality of illumination nodes in the illumination control system sense that the user exists, t brightness commands sent by plural illumination nodes may exist in the system, and the illumination node which does not actively send the lighting instruction, after receiving the lighting instructions sent by the plural nodes, may select the lighting instruction sent by the closest illumination node to adjust the illumination brightness thereof, so as to provide a more comfortable illumination service for the user.

The master controller 111 may further be configured to, after receiving the lighting instructions sent by the plural illumination nodes, obtain the matrix coordinates of the plural illumination nodes; calculate the distances between the illumination nodes belonging to the same illumination subregion as the illumination node to which the master controller belongs and the illumination node to which the master controller belongs respectively, rank the calculated distances; according to the shortest distance and the illumination scenario defined currently for the illumination node to which the master controller belongs, calculate the required brightness level of the illumination node, adjust the output parameters of the drive apparatus 120 in the wireless master control apparatus of the illumination node to which the master controller belongs based on the brightness level, and control the illumination brightness of the illumination unit 130 controlled by the drive apparatus 120.

Optionally, the master controller may further be configured to, when not receiving a new lighting instruction after the duration of the current brightness level of the illumination node to which the master controller belongs reaches a preset time, switch the illumination brightness level to the next illumination brightness level required by the illumination scenario defined currently for the illumination node.

With reference to FIG. 2, the illumination control system may further include a relay node 300 which is wirelessly connected with each illumination node in the illumination control system, and after receiving the lighting instruction sent by any illumination node 100, the relay node 150 forwards the lighting instruction. The wireless master control apparatus 110 serves as the relay node. For example, in certain places where no illumination is required for deployment, but a wireless signal is required to be enhanced for transmission, such as a closed conference room or a corner where the wireless signal may be attenuated or blocked, the wireless signal may be forwarded by the wireless master control apparatus 110 which is provided independently. When independently provided as the relay node in the illumination control system, the wireless master control apparatus 110 may be powered by a power source or a battery.

According to the illumination control system according to the example of the present disclosure, the illumination node is combined with sensor control, and the state and data of the sensor are precisely processed to control the illumination node; for example, the illuminance sensor only corrects the light of the illumination node in which the illuminance sensor is located, so that the region where the illuminance sensor is located may be corrected more precisely, a large region is changed into small regions for processing, an efficiency is improved, and other nodes are not influenced. With the illumination control system according to the present disclosure, intelligent control may be realized more flexibly and more accurately with more energy saved, and the illumination light is more comfortable. Besides basic switching requirements, the system includes different innovative scenario combinations, and has better user experiences while saving energy and protecting the environment.

Figure 3:
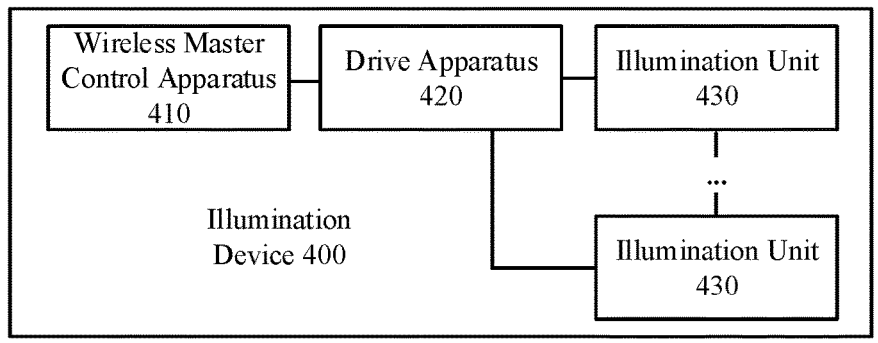
FIG. 3 is a schematic structural diagram of an illumination device according to an example of the present disclosure.

Another example of the present disclosure further provides an illumination device 400. As shown in FIG. 3, the illumination device 400 according to the present example may include a wireless master control apparatus 410, a drive apparatus 420 connected with the wireless master control apparatus 410, and at least one illumination unit 430 controlled by the drive apparatus 420. The wireless master control apparatus 410 is configured to adjust output parameters of the drive apparatus 420 in the illumination node to which the wireless master control apparatus belongs according to environment information within a specific range, and control an illumination brightness of the illumination unit 430 controlled by the drive apparatus 420. The illumination unit 430 may have various forms, and may also be provided therein with a substrate and a light source. When configured as a ceiling lamp, the illumination unit 430 may include a chassis and a cover, and may include a base, a reflector, a face ring, or the like, when configured as a tube spotlight.

Figure 4:
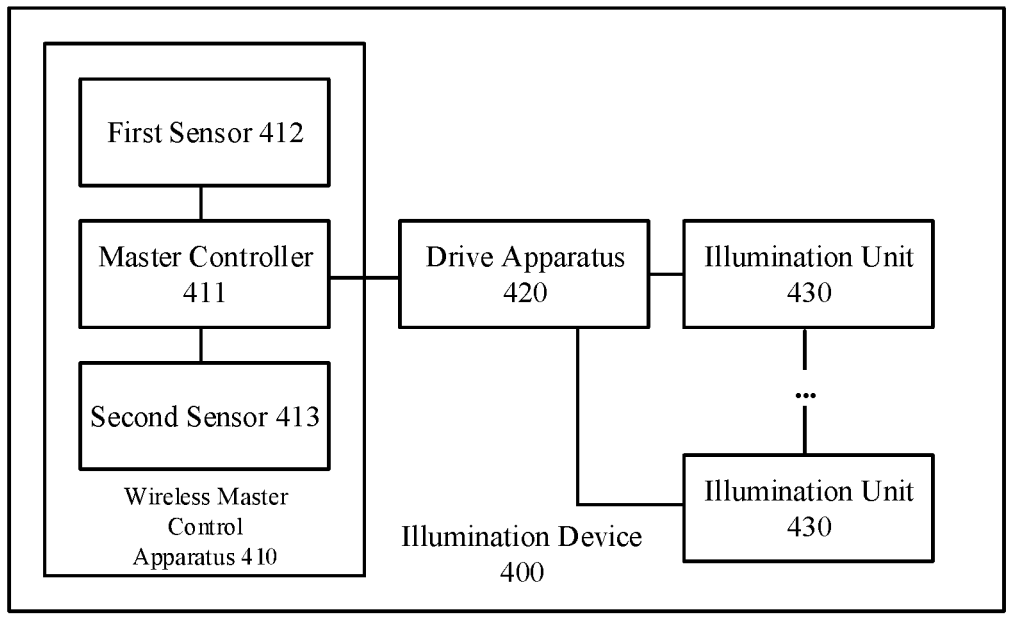
FIG. 4 is a schematic structural diagram of an illumination device according to an example of the present disclosure.

Further, as shown in FIG. 4, the wireless master control apparatus 410 may include a master controller 411, as well as a first sensor 412 and a second sensor 413 which are connected with the master controller 411. The first sensor 412 is configured to detect a brightness of a current environment, convert the brightness of the current environment into readable illuminance data, and transmit the readable illuminance data to the master controller 411; the second sensor 413 is configured to transmit a sensing signal to the master controller 411 when sensing that a user exists in a specified range; the master controller 411 is configured to receive the readable illuminance data transmitted by the first sensor 412 and/or the sensing signal transmitted by the second sensor 413, and adjust the output parameters of the drive apparatus 420 in the illumination device 400 to which the master controller belongs based on the readable illuminance data and/or the sensing signal, so as to control the illumination brightness of the illumination unit 430.

In this example, the master controller 411 and the first and second sensors 412, 413 in the wireless master control apparatus 410 are integrally disposed to form the wireless master control apparatus 410; for the overall configuration of the illumination device 400, the wireless master control apparatus 410 may be integrally provided in the illumination unit 430, and the drive apparatus 420 is provided separately from the illumination unit 430; the wireless master control apparatus 410, the drive apparatus 420 and the illumination unit 430 may also be arranged separately, which is not limited in the present disclosure.

The illumination device 400 according to the example may be provided separately in plural application scenarios, or plural illumination devices 400 may be provided in an indoor or outdoor scenario, and establish communication connection with each other. Preferably, the master controller 411 may further have a wireless communication function, and when the system has a plurality of illumination devices 400, any illumination device 400 may be wirelessly connected with other illumination devices or other wireless apparatuses by the master controller 411 with a wireless communication technology, such as Bluetooth, WiFi, ZigBee, or the like, so as to perform data transmission. In practical applications, the master controller 411 may be configured as a single chip microcomputer integrated with a wireless function, or other devices with the above-mentioned functions.

Figure 5:
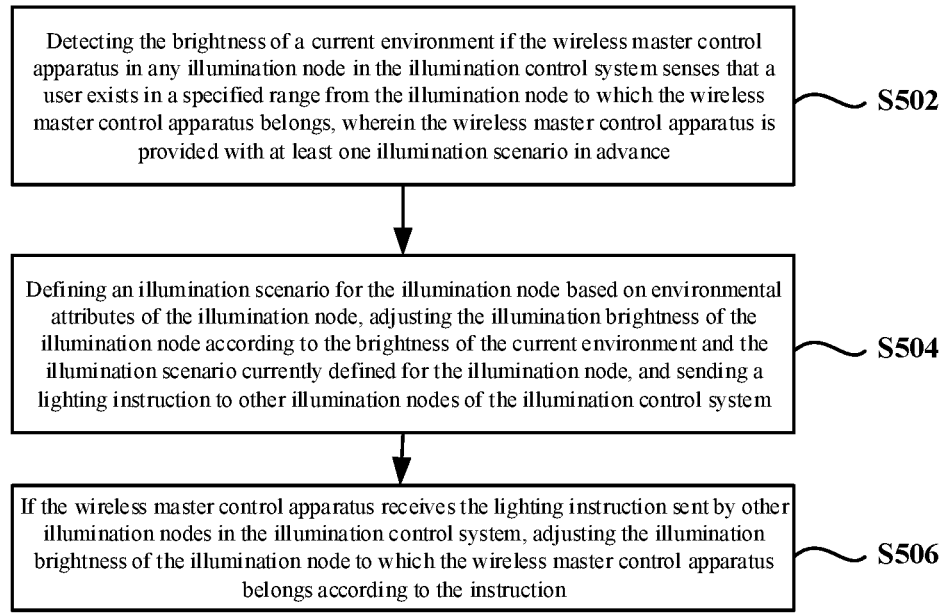
FIG. 5 is a schematic flow chart of an illumination control method according to an example of the disclosure.

Corresponding to the above-mentioned illumination control system, an example of the present disclosure further provides an illumination control method which is applied to an illumination control system provided with a plurality of illumination nodes capable of communicating with each other and each having a wireless master control apparatus. As shown in FIG. 5, the illumination control method according to the example of the present disclosure may include:

step S502: detecting the brightness of a current environment if the wireless master control apparatus in any illumination node in the illumination control system senses that a user exists in a specified range from the illumination node to which the wireless master control apparatus belongs;

step S504: defining an illumination scenario for the illumination node based on environmental attributes of the illumination node, adjusting the illumination brightness of the illumination node according to the brightness of the current environment and the illumination scenario currently defined for the illumination node, and sending a lighting instruction to other illumination nodes of the illumination control system; and step S506: if the wireless master control apparatus receives the lighting instruction sent by other illumination nodes in the illumination control system, adjusting the illumination brightness of the illumination node to which the wireless master control apparatus belongs according to the lighting instruction.

The example of the present disclosure provides the illumination control method which is more intelligent, and when the user exists in the specified range of any illumination node, an illumination service may be provided for the user in conjunction with the brightness of the current environment and the illumination scenario defined currently for the illumination node. In addition, a brightness instruction may also be sent to other illumination nodes to realize interconnection of the illumination nodes, and working states of different illumination nodes are flexibly controlled according to a position of the user, so that intelligent control of the illumination node is more flexible and accurate, and saves more energy.

Further, after the step S504, the method may further include step S508: receiving a lighting instruction sent by other illumination nodes in the illumination control system to the illumination node to which the wireless master control apparatus does not belong, and forwarding the lighting instruction. That is, the wireless master control apparatus may receive the lighting instruction sent by any other illumination node; after receiving the lighting instruction, judge whether the received lighting instruction is specific to the illumination node to which the wireless master control apparatus belongs (according to the condition whether the illumination node sending the lighting instruction and the illumination node to which the wireless master control apparatus belongs belong to the same illumination subregion or other conditions); if the received lighting instruction is specific to the illumination node, adjust the illumination brightness of the illumination node according to the lighting instruction; and if the received lighting instruction is not specific to the illumination node, only forward the lighting instruction.

Optionally, the illumination control system may further include a configurator which is provided with a preset matrix diagram and may be wirelessly connected with each illumination node in the illumination control system. The illumination control method according to the present example may further include:

step S1: identifying, by the configurator, the illumination region of the illumination control system, and dividing the illumination control system into a plurality of independent illumination subregions according to actual region division after completion of deployment of each illumination node in the illumination control system;

step S2: selecting any illumination subregion, establishing communication connection with each illumination node in the illumination subregion respectively, deploying each illumination node into the preset matrix diagram according to an actual position of each illumination node, and generating a matrix coordinate for each illumination node for recording;

step S3: determining whether the matrix coordinate of each illumination node in the illumination subregion is correct or not, and when the matrix coordinate of any illumination node in the illumination subregion is incorrect, reconfiguring a matrix coordinate for the illumination node; and step S4: after completion of the configuration of the matrix coordinate of each illumination node, transmitting the matrix coordinate corresponding to each illumination node to the illumination node.

During region division, the same illumination regions serve as a group, the node is deployed in a matrix, each node may be used as a master control node or a slave node. The master control node is the illumination node sending the brightness instruction, and the slave node is the illumination node receiving the lighting instruction sent by other illumination nodes, and the illumination brightness of the slave node is adjusted according to the lighting instruction. The brightness instruction may be forwarded between different illumination subregions, but the illumination subregion does not perform own illumination output. The matrix coordinate corresponding to each illumination node may be transmitted to the illumination node after generation of the matrix coordinates of all the illumination nodes in the same illumination subregion. The matrix coordinates may be transmitted by the configurator one by one, or transmitted directly after generation of the matrix coordinate of each illumination node, which is not limited in the present disclosure.

When the matrix diagram is generated for any illumination subregion, the step S2 may further include selecting any illumination subregion, establishing communication connection with any one illumination node in the illumination subregion, deploying the illumination node into the preset matrix diagram as an origin of matrix coordinates, sequentially establishing communication connection with other illumination nodes in the illumination subregion, deploying these illumination nodes into the preset matrix diagram according to actual positions of these illumination nodes, and generating and recording matrix coordinates for these illumination nodes.

Preferably, the method may further include step S5: if the configuration of the matrix coordinate of each illumination node is completed, generating a matrix diagram with each illumination node in the illumination subregion as a matrix element based on the matrix coordinate of each illumination node in the illumination subregion, and transmitting the matrix diagram to each illumination node for storage by the wireless master control apparatus of each illumination node. The preset matrix diagram may be preferably a two-dimensional matrix; the configurator is preferably configured as a mobile terminal. After generated, the matrix diagram of the illumination subregion may also be uniformly transmitted to each illumination node and stored by the wireless master control apparatus of each illumination node.

Figure 6:
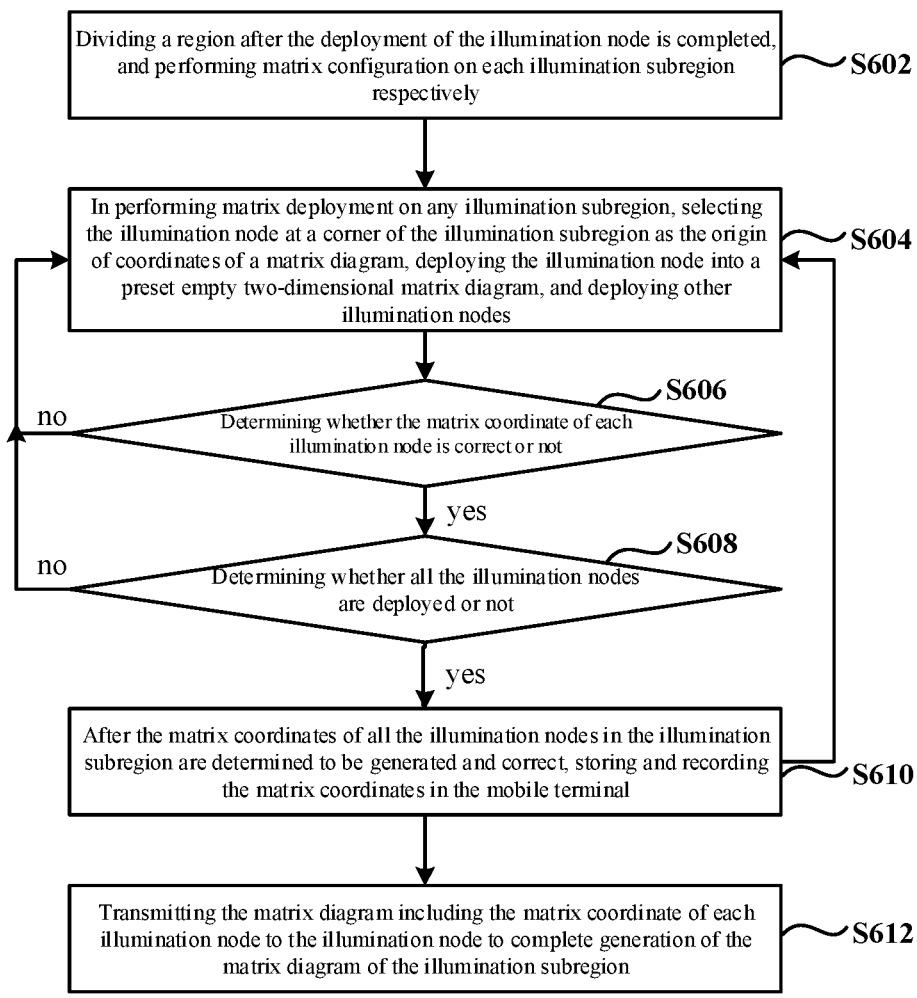
FIG. 6 is a schematic flow chart of a method of generating an illumination partition matrix graph according to an example of the disclosure.
Figure 7:
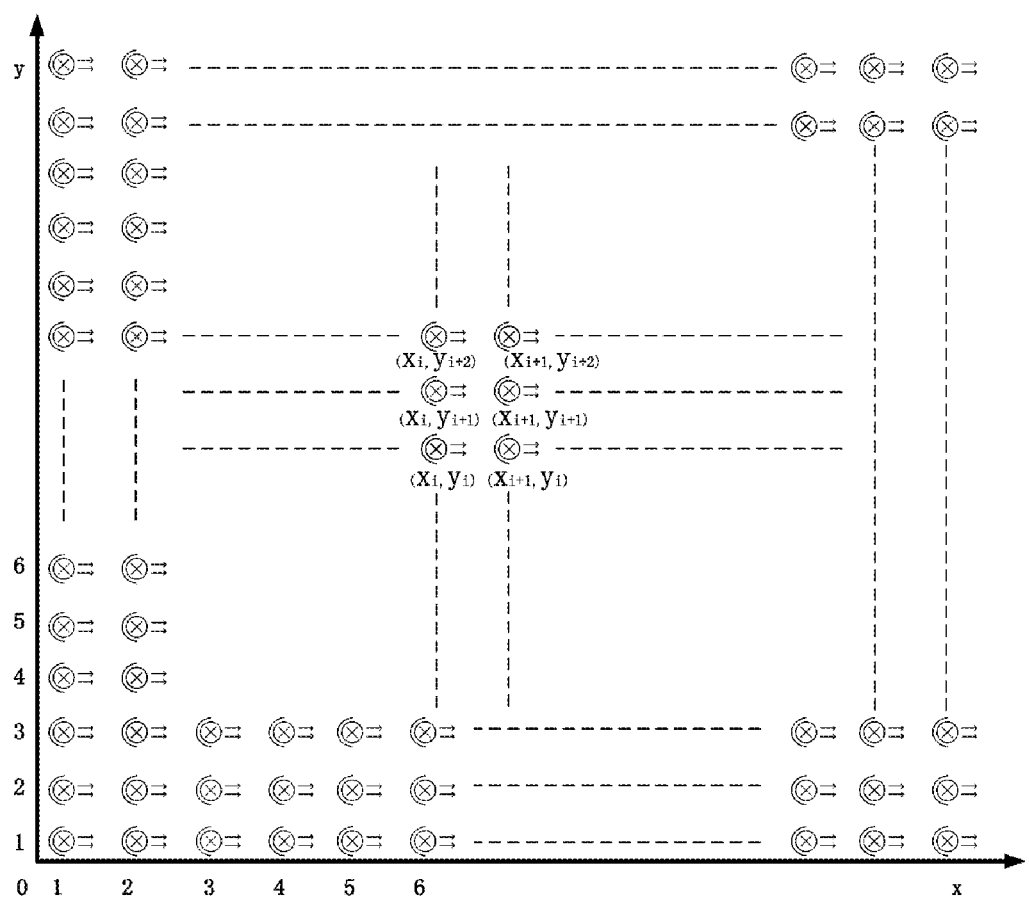
FIG. 7 is an illumination partition matrix graph according to an example of the present disclosure.

FIG. 6 is a schematic flow chart of a method of generating a matrix diagram of any illumination subregion by a mobile terminal according to an example of the present disclosure, and as shown in FIG. 6, the method of generating the matrix diagram of the illumination subregion according to the present disclosure may include:

step S602: firstly, identifying the illumination region covered by the illumination control system, dividing the illumination region after the deployment of the illumination nodes is completed, and performing matrix configuration on each illumination subregion respectively, such as an open office, a passageway, a front desk, a closed conference room, or the like, wherein a light source of each region does not influence control of other regions, and the light source is not deployed by default after each illumination node is powered on, so that a beacon signal may be broadcasted with low power consumption after each illumination node is powered on to wait for a connection confirmation of the mobile terminal;

step S604: in performing matrix deployment on any one illumination subregion, selecting the illumination node at a corner of the illumination subregion as the origin of coordinates of the matrix diagram, deploying the illumination node into a preset empty two-dimensional matrix diagram, approaching other illumination nodes in the illumination subregion, obtaining one illumination node every time, deploying the illumination node into the matrix diagram according to the actual position of the illumination node relative to the origin of coordinates, and generating and recording a matrix coordinate and then transmitting the matrix coordinate into the corresponding illumination node for storage by the wireless master control apparatus of each illumination node;

step S606: determining whether the matrix coordinate of each illumination node in the illumination subregion is correct or not, if not, which means that coordinate information is written wrongly, performing configuration again within a short time after electrification, repeating the step S604, and if yes, performing step S608;

step S608: determining whether all the illumination nodes in the illumination subregion are deployed or not, if not, repeating the steps S604-S606, and if yes, performing step S610;

step S610: after the matrix coordinates of all the illumination nodes in the illumination subregion are determined to be generated and correct, storing and recording the matrix coordinates in the mobile terminal, wherein the matrix diagram of the illumination subregion may be as shown in FIG. 7; and step S612: transmitting the matrix diagram including the matrix coordinate of each illumination node to the illumination node to complete generation of the matrix diagram of the illumination subregion.

The matrix diagram of each illumination subregion may be a two-dimensional matrix diagram or a one-dimensional coordinate, such as a node of the passage or the corridor, or may include a single point, such as an independent light source node of an emergency exit, a wall washer light, or the like, which is not limited in the present disclosure.

After the matrix coordinate of the illumination node is generated, the step S604 may include only recording the matrix coordinate of each illumination node locally, and after the matrix coordinates of all the illumination nodes in the whole illumination subregion are generated, collectively transmitting the coordinate information to the illumination nodes through a wireless network.

Based on the method according to the above-mentioned example, matrix configuration may be performed on each illumination subregion in the illumination control system to generate the matrix diagram. After completion of matrix configuration of each illumination subregion, each matrix actually corresponds to a different functional region, the corresponding scenario is required to be selected for cooperation with matrix calculation control, and by default, each illumination node has several common scenarios, such as safe illumination, the wall washer light, night illumination, unmanned illumination, passageway illumination, or the like. In a period of time after each illumination node is physically powered on, a beacon broadcast packet may be emitted with a low power, the configurator obtains an MAC address of each illumination node by means of proximity induction, and meanwhile transmits the corresponding matrix coordinate to the illumination node, and the illumination node is restarted to enter into a normal working mode after configuration is completed. If connection control of the configurator is not received within a certain time, the illumination node enters into a factory configuration mode. After matrix deployment is completed, each illumination subregion is a two-dimensional matrix diagram, and the matrix may be large or small.

In the example of the present disclosure, the definition of the illumination scenario for each illumination subregion is controlled and applied based on a matrix method. Each illumination node has common default scenario setting, only a scenario number is required to be selected, and each scenario is formed by a single scenario control parameter mentioned below or a combination of the scenario control parameters. Therefore, after the matrix diagram and the matrix coordinate corresponding to each illumination node are transmitted to the illumination node, the method may further include: setting one or more illumination scenarios for the illumination nodes in each illumination subregion based on the attribute function of each illumination subregion and the preset scenario control parameters, and distributing the scenario number for each illumination scenario, wherein the scenario control parameters include a plurality of brightness levels for each illumination node and the duration of each brightness level.

Figure 8:
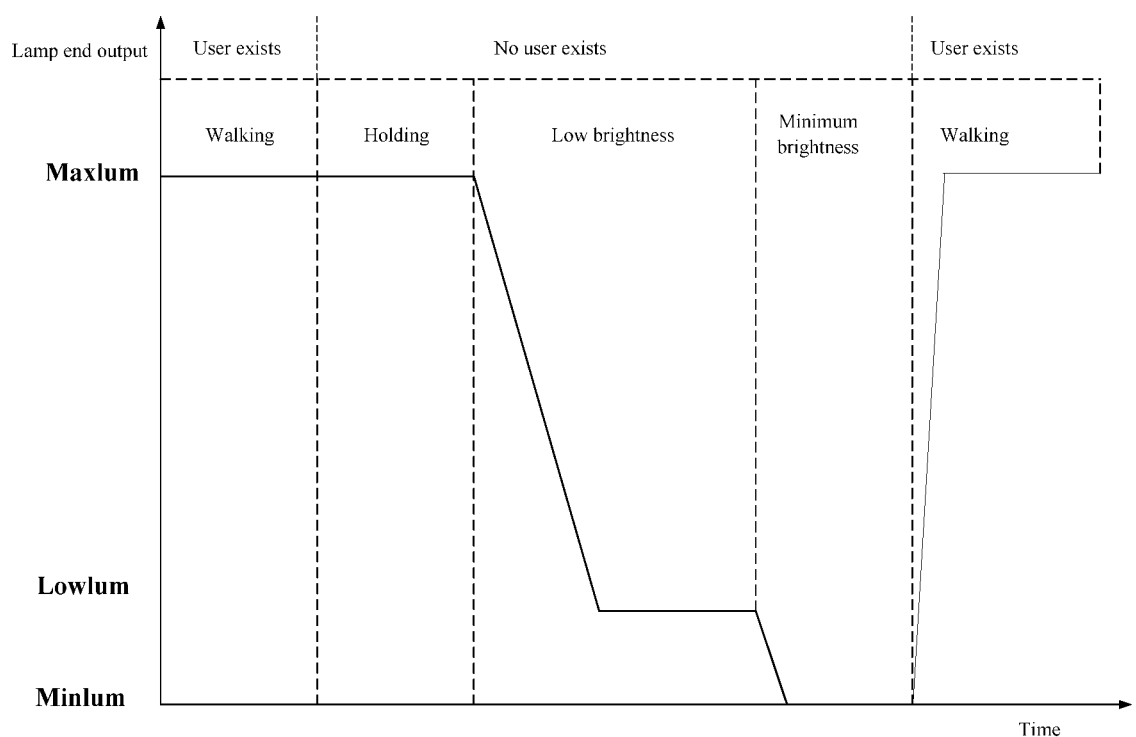
FIG. 8 is a schematic diagram of scenario control parameters according to an example of the disclosure.

Preferably, as shown in FIG. 8, the scenario control parameters may include:

1. maximum brightness level (Maxlum Level), referring to the maximum brightness when a user exists within a specified range from the illumination node. In general, the illumination brightness of the new illumination node is not 100%, but about 80%; considering that long-term use of the illumination node may cause light attenuation of an LED, the brightness level may be automatically increased to maintain the maximum brightness level if the illumination brightness is required to be maintained.

In addition, in consideration of balance between comfort and energy conservation, natural light compensation is performed in the daytime, and with 80% as a target, the actual brightness is corrected by the LED when natural light is insufficient. For example, when the current brightness is 640 lux, and a target is 320 lux, the brightness may be adjusted to 340 (5-10%) firstly, each region is then finely tuned independently, and small range approaching is performed until satisfaction;

2. maximum brightness holding time (Holdingtime), referring to the holding time of the maximum brightness level when the user exists; if the wireless master control apparatus does not detect the existence of a user within a certain time, the illumination node is switched to a stable low brightness level, and the brightness is automatically reduced to save energy. The time may be 10 seconds to 60 minutes, and is 10 minutes by default, so as to balance energy conservation and comfort.

3. stable low-brightness level (Lowlum Level), referring to the illumination level which may be kept no matter whether the user exists within the specified range from the illumination node or not; for example, for safety illumination, a non-zero level is required to be kept no matter whether someone exists or not; for the night passageway, a 10% brightness level is required to be kept when no person exists; for an unmanned or off-duty elevator room, the stable low-brightness level is also required to be automatically maintained;

4. stable low-brightness holding time (Lowlum Time), referring to the maintaining time before a lamp is turned off completely and may be 10 minutes by default; and 5. minimum brightness level (Minlum Level), referring to the minimum brightness when the illumination node does not provide an illumination service, i.e., the minimum brightness when the lamp is turned off completely, which is substantially 0; when the stable low-brightness holding time is reached, the illumination node may be automatically in a turned-off state, and the user is not required to manually and physically interrupt power off and turn off the lamp during the off-duty time, which saves the time of the user.

With the above scenario control parameters, the illumination service may be automatically provided for the user according to the requirement of the user without manual participation of the user, thereby improving user experiences.

The above-mentioned scenario control parameters may be combined to be used for different illumination scenarios and different illumination functions, such as a closed conference room, a toilet, a storage room, a passageway, an open office, or the like. The above-mentioned scenario control parameters are only listed schematically, and in practical applications, other scenario control parameters may be set according to requirements to perform custom definition of a new illumination scenario.

Preferably, the wireless master control apparatus in each illumination node may include a master controller, as well as a first sensor and a second sensor which are connected with the master controller; the step S502 may further include: when the second sensor in the wireless master control apparatus of any one illumination node in the illumination system detects that the user exists in the specified range, transmitting a sensing signal to the master controller, sensing the brightness of the current environment by the first sensor, converting the brightness of the current environment into readable illuminance data, and transmitting the data to the master controller; the step S504 may further include: receiving, by the master controller, the readable illuminance data transmitted by the first sensor and/or the sensing signal transmitted by the second sensor, and adjusting the illumination brightness of the illumination node to which the master controller belongs based on the readable illuminance data and/or the sensing signal and the illumination scenario defined currently for the illumination node. Optionally, the first sensor 112 is preferably configured as an illuminance sensor, and the second sensor 113 is preferably configured as a movement sensor.

In the example of the present disclosure, the illuminance sensor is combined with the illumination node to only correct the illuminance of the node in which the illuminance sensor is located without controlling other illumination nodes in the illumination subregion, so that the illumination node is more comfortable, and a great effect influence caused at different positions, such as a window, a wall, or the like, is reduced greatly. By combining the movement sensor and the illumination node, each illumination node may rapidly respond to the existence of the user in time, and a hot-spot infrared movement sensor with an appropriate sensing range may be selected according to the distance between the illumination nodes.

After the step S5023, the lighting instruction may also be sent to other illumination nodes of the illumination control system, and the lighting instruction carries the matrix coordinate of the illumination node to which the master controller belongs. In practical applications, when the illumination node sensing the existence of the user provides the illumination brightness independently, an illumination effect is not satisfactory. In the above-mentioned example, after sensing the existence of the user, the illumination node may send the lighting instruction to other illumination nodes, and is assisted in illumination by other illumination nodes.

In the step S504, after the wireless master control apparatus receives the lighting instruction sent by other illumination nodes, the illumination brightness of the illumination node to which the wireless master control apparatus belongs may be controlled based on the lighting instruction. The step S504 may further include:

step S5041: if the master controller receives the lighting instruction sent by other illumination nodes, acquiring the matrix coordinate of the illumination node sending the lighting instruction;

step S5042: when the illumination node sending the lighting instruction and the illumination node to which the master controller belongs are determined to belong to the same illumination subregion, calculating a distance between the illumination node sending the lighting instruction and the illumination node to which the master controller belongs;

step S5043: based on the distance and the illumination scenario defined currently for the illumination node to which the master controller belongs, calculating the required brightness level of the illumination node, and adjusting the illumination brightness of the illumination node to which the master controller belongs based on the brightness level.

In the present example, each illumination node serves as the master controller to send the lighting instruction, and contains own matrix coordinate, and besides own illumination output, the illumination nodes in the same region receive the lighting instruction, and calculate the distance according to own coordinates, thereby calculating own output parameters of the corresponding illumination nodes according to respective illumination scenarios which are defined currently. If a plurality of lighting instructions are received, the output is performed according to the nearest lighting instruction after calculation.

The brightness level of an illumination node is related to the distance from the illumination node sending the lighting instruction. If the movement sensor of an illumination node senses that the user exists in the specified range from the illumination node, the illumination node closest to the user (i.e., the illumination node to which the movement sensor belongs) also has the maximum output of 100%, and the brightness levels of the illumination nodes which are further are changed into 70%, 40%, 10% and 0 sequentially, so that the light of the region where the user is located is always maintained in the most comfortable state, and the illumination output of the further illumination nodes having small influences on the user may be reduced to save energy. Each brightness level may also be adjusted according to an actual application environment, which is not limited in the present disclosure.

Further, the above-mentioned example may further include step S5044: if the master controller receives the lighting instructions sent by plural illumination nodes, obtaining the matrix coordinates of the plural illumination nodes, calculating the distances between the illumination nodes belonging to the same illumination subregion as the illumination node to which the master controller belongs and the illumination node to which the master controller belongs respectively, and ranking the calculated distances;

step S5045: according to the shortest distance and the illumination scenario defined currently for the illumination node to which the master controller belongs, calculating the required brightness level of the illumination node, and adjusting the illumination brightness of the illumination node to which the master controller belongs based on the brightness level.

When a plurality of users are located at different positions in a certain application scenario, a plurality of illumination nodes may send the lighting instructions simultaneously, and when the illumination node which does not sense the user receives the plural lighting instructions simultaneously, the lighting instruction sent by the closest illumination node is adopted for assistance in illumination.

In the method according to the example of the present disclosure, the illumination brightness may also be adjusted automatically under the condition that no new lighting instruction is provided. That is, the above-mentioned method may further include: if no new lighting instruction is received after the duration of the current brightness level of the illumination node to which the master controller belongs reaches a preset time, controlling the illumination node to be switched to the next illumination brightness level required by the illumination scenario defined currently.

Furthermore, the illumination control system may further include a relay node which is wirelessly connected with each illumination node in the illumination control system; if receiving any lighting instruction, the relay node forwards the lighting instruction; the wireless master control apparatus is preferably configured as the relay node. For example, in certain places where no illumination is required for deployment, but a wireless signal is required to be enhanced for transmission, such as a closed conference room or a corner where the wireless signal may be attenuated or blocked, the wireless signal may be forwarded by the independent module.

Figure 9:
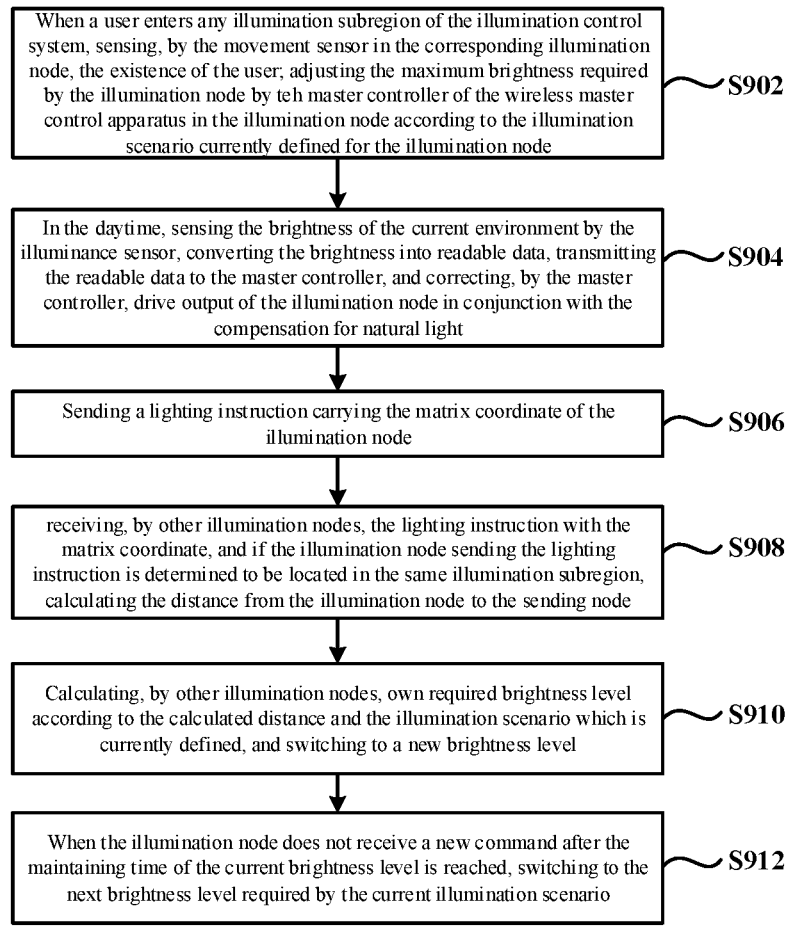
FIG. 9 is a schematic flow chart of an illumination control method according to an example of the disclosure.
Figure 10:
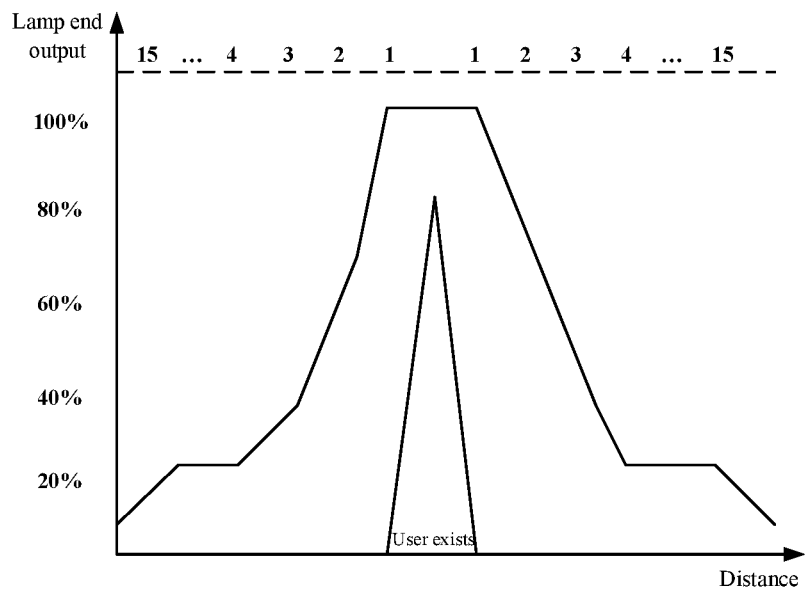
FIG. 10 is a schematic diagram of illumination output control according to an example of the present disclosure.

The illumination control method is described in detail below according to a particular example. FIG. 9 is a schematic flow chart of an illumination control method according to an example of the present disclosure, and as shown in FIG. 9, the illumination control method according to the example of the present disclosure may include:

step S902: when a user enters any illumination subregion of the illumination control system, sensing, by the movement sensor in the corresponding illumination node, the existence of the user; adjusting the maximum brightness required by the illumination node by the master controller of the wireless master control apparatus in the illumination node according to the illumination scenario currently defined for the illumination node;

step S904: in the daytime, sensing the brightness of the current environment by the illuminance sensor, converting the brightness into readable data, transmitting the readable data to the master controller, and correcting, by the master controller, the drive output of the illumination node in conjunction with the compensation for natural light;

step S906: sending a lighting instruction carrying the matrix coordinate of the illumination node;

step S908: receiving, by other illumination nodes, the lighting instruction with the matrix coordinate, and if the illumination node sending the lighting instruction is determined to be located in the same illumination subregion, calculating the distance from the illumination node to the sending node according to an optimal path algorithm;

the coordinate of a master control node (the illumination node sending the lighting instruction): (x0, y0)

the coordinate of a controlled node (the illumination node receiving the lighting instruction): (xi, yi)

a distance grade: $d=(xi-x0)+(yi-y0)$ step S910: calculating, by other illumination nodes, own required brightness level according to the calculated distance and the illumination scenario which is currently defined, and switching to a new brightness level;

step S912: when the illumination node does not receive a new command after the maintaining time of the current brightness level is reached, switching to the next brightness level required by the current illumination scenario;

for example, data for the illumination scenario is as follows:

Maxlum=100
Holdingtime=10 min
Level1=100%, level2=70%, level3=40%, level4=10%, level5=−10%
Lowlum=10%
Deep=0%
Lowlum Time=10 min Corresponding target level data is obtained according to the calculated distance. If the received new command indicates a nearer level, the illumination node is switched to the new level immediately, and if the new command is a dimming command, the brightness is decreased slowly to the next level after the holding time. The scenario is suitable for a general commercial office environment, and when one node senses the existence of the user, the closest lamp node also has the maximum output of 100%, and the brightnesses of the nodes which are further are changed into 70%, 40%, 10% and 0 sequentially, so that the light of the region where the user is located is always maintained in the most comfortable state, and the illumination output of the further nodes having small influences on the user may be reduced to save energy. FIG. 10 schematically shows an illumination output control diagram.

The examples of the present disclosure provide the illumination control system, the illumination control method and the illumination control device. The wireless master control apparatus is provided in each illumination node of the illumination control system to sense the environment adjacent to the illumination node and further adjust the illumination brightness of the illumination node to which the wireless master control apparatus belongs to the optimum illumination state based on the sensing result in combination with the illumination scenario defined currently by the illumination node, and send the lighting instruction to other illumination modes in the illumination control system. In addition, the wireless master control apparatus may further receive the lighting instruction sent by other illumination nodes, thereby further adjusting the illumination brightness of the illumination node to which the wireless master control apparatus belongs.

The illumination control system and method according to the examples of the present disclosure further have the following advantages: (1) power consumption is reduced, comfort level is improved: different regions being controlled separately, each illumination node being identified automatically, so that energy-saving and comfortable management is achieved; (2) each illumination node is simply arranged and configured variously; different regions, such as stairs, storage rooms and display areas, may be processed by using scenario modes which are easily adapted; (3) each illumination node is modularized, componentized and systematized; and products are all standardly configured, and scenario setting and system interaction are completed while the matrix is generated.

The example of the present disclosure provides a single-node calibration technology, and each illumination node may support correction of illumination output caused by environmental factors, such as an associated window, a skylight, direct sunlight, night, floor color, or the like, so that comfort is really achieved. The problem of light attenuation of the illumination unit (such as an LED lamp) over time may also be solved with a method of increasing the maximum brightness gradually, and the effective service life of the LED is prolonged fully.

The present disclosure provides an illumination control system and method, and an illumination device.

According to a first aspect of the present disclosure, an illumination control system is provided, which includes a plurality of illumination nodes which are capable of communicating with each other, wherein the illumination node is provided therein with a wireless master control apparatus, a drive apparatus connected with the wireless master control apparatus, and at least one illumination unit controlled by the drive apparatus;

the wireless master control apparatus is configured to detect a brightness of a current environment in a case where the wireless master control apparatus senses that a user exists within a specified range from the illumination node to which the wireless master control apparatus belongs;

the wireless master control apparatus is further configured to:

define an illumination scenario for the illumination node to which the wireless master control apparatus belongs based on an environmental attribute of the illumination node;

adjust an output parameter of the drive apparatus in the illumination node according to the brightness and the illumination scenario currently defined for the illumination node to control an illumination brightness of the illumination unit; and send a lighting instruction to a remaining illumination node of the illumination control system; and the wireless master control apparatus is further configured to receive a lighting instruction sent by a remaining illumination node in the illumination control system to the illumination node to which the wireless master control apparatus belongs, and adjust an illumination brightness of the illumination node according to the lighting instruction.

Optionally, the wireless master control apparatus is further configured to receive and forward a lighting instruction which is sent by a remaining illumination node in the illumination control system to a illumination node to which the wireless master control apparatus does not belong.

Optionally, the illumination control system further comprises a configurator which is provided with a preset matrix diagram and is capable of being wirelessly connected with each illumination node in the illumination control system; wherein the configurator is configured to: identify an illumination region of the illumination control system, and divide the illumination control system into a plurality of independent illumination subregions according to an actual region division after an deployment of each illumination node in the illumination control system is completed; select any one of the plurality of illumination subregions, establish a communication connection with each illumination node in the any one of the plurality of illumination subregions respectively, deploy each illumination node into the preset matrix diagram according to an actual position of each illumination node, and generate a matrix coordinate for each illumination node for recording; determine whether a matrix coordinate of each illumination node in the any one of the plurality of illumination subregions is correct or not, and in a case where the matrix coordinate of any illumination node in the any one of the plurality of illumination subregions is incorrect, reconfigure a matrix coordinate for the any illumination node; and transmit the matrix coordinate corresponding to each illumination node to each illumination node after a configuration of the matrix coordinate of each illumination node is completed.

Optionally, the configurator is further configured to: select any one of the plurality of illumination subregions, establish a communication connection with any illumination node in the any one of the plurality of illumination subregions; deploy the any illumination node into the preset matrix diagram as an origin of matrix coordinates; sequentially establish a communication connection with other illumination nodes in the any one of the plurality of illumination subregions; deploy the other illumination nodes into the preset matrix diagram according to actual positions of the other illumination nodes; and generate and record matrix coordinates for the other illumination nodes.

Optionally, the configurator is further configured to: generate a matrix diagram with each illumination node in the any one of the plurality of illumination subregions as a matrix element based on the matrix coordinate of each illumination node in the any one of the plurality of illumination subregions, after the configuration of the matrix coordinate of each illumination node is completed; and transmit the matrix diagram to each illumination node for storage by the wireless master control apparatus of each illumination node.

Optionally, the configurator is further configured to: set one or more illumination scenarios for the illumination nodes in each illumination subregion based on an attribute function of each illumination subregion and preset scenario control parameters, and assign a scenario number for each illumination scenario; wherein the scenario control parameters comprise a plurality of brightness levels for each illumination node and a duration of each brightness level.

Optionally, the configurator is further configured to set one or more illumination scenarios for each illumination subregion according to following scenario control parameters:

a maximum brightness level, referring to a maximum brightness used in a case where a user exists within a specified range from the illumination node;

a maximum brightness holding time, referring to a holding time of the maximum brightness level in a case where the user exists;

a stable low-brightness level, referring to an illumination level which is kept no matter whether the user exists within the specified range from the illumination node or not;

a stable low-brightness holding time, referring to a maintaining time before a lamp is turned off completely; and/or a minimum brightness level, referring to a minimum brightness used in a case where the illumination node does not provide an illumination service.

Optionally, the wireless master control apparatus comprises a master controller and a first sensor and a second sensor which are connected with the master controller;

the first sensor is configured to sense the brightness of the current environment, convert the brightness of the current environment into readable illuminance data, and transmit the readable illuminance data to the master controller;

the second sensor is configured to transmit a sensing signal to the master controller in a case where the second sensor senses that the user exists in the specified range; and the master controller is configured to receive the readable illuminance data transmitted by the first sensor and/or the sensing signal transmitted by the second sensor, adjust an output parameter of the drive apparatus in the illumination node to which the master controller belongs based on the readable illuminance data and/or the sensing signal and the illumination scenario defined currently for the illumination node, and control the illumination brightness of the illumination unit controlled by the drive apparatus.

Optionally, the master controller is further configured to:

send a lighting instruction to a remaining illumination node of the illumination control system in a case where the master controller receives the sensing signal transmitted by the second sensor indicating that the user exists, wherein the lighting instruction carries the matrix coordinate of the illumination node to which the master controller belongs.

Optionally, the master controller is further configured to:

after receiving a lighting instruction sent by a remaining illumination node, acquire a matrix coordinate of the illumination node sending the lighting instruction;

in a case where the illumination node sending the lighting instruction and the illumination node to which the master controller belongs are determined to belong to a same illumination subregion, calculate a distance between the illumination node sending the lighting instruction and the illumination node to which the master controller belongs; and based on the distance and the illumination scenario currently defined for the illumination node to which the master controller belongs, calculate a required brightness level of the illumination node, adjust the output parameter of the drive apparatus in the wireless master control apparatus of the illumination node to which the master controller belongs based on the brightness level, and control the illumination brightness of the illumination unit controlled by the drive apparatus.

Optionally, the master controller is further configured to:

in a case where the master controller receives lighting instructions sent by a plurality of illumination nodes, obtain matrix coordinates of the plurality of illumination nodes, calculate distances between the illumination nodes belonging to a same illumination subregion as the illumination node to which the master controller belongs and the illumination node to which the master controller belongs respectively, and rank the calculated distances; and based on a shortest distance and the illumination scenario currently defined for the illumination node to which the master controller belongs, calculate a required brightness level of the illumination node, adjust the output parameter of the drive apparatus in the wireless master control apparatus of the illumination node to which the master controller belongs based on the brightness level, and control the illumination brightness of the illumination unit controlled by the drive apparatus.

Optionally, the master controller is further configured to:

in a case where no new lighting instruction is received after a duration of a current brightness level of the illumination node to which the master controller belongs reaches a preset time, control the illumination node to be switched to a next illumination brightness level required by the illumination scenario which is currently defined.

Optionally, the illumination control system further comprises a relay node which is wirelessly connected with each illumination node in the illumination control system, wherein the relay node is configured to forward the lighting instruction after receiving a lighting instruction sent by any illumination node; and the wireless master control apparatus serves as the relay node.

According to another aspect of the present disclosure, an illumination device is provided, which includes a wireless master control apparatus, a drive apparatus connected with the wireless master control apparatus, and at least one illumination unit controlled by the drive apparatus; wherein the wireless master control apparatus is configured to adjust an output parameter of the drive apparatus in the illumination node to which the wireless master control apparatus belongs according to environment information within a specific range, and control an illumination brightness of the illumination unit controlled by the drive apparatus.

Optionally, the wireless master control apparatus comprises a master controller, and a first sensor and a second sensor which are connected with the master controller; the first sensor is configured to sense a brightness of a current environment, convert the brightness of the current environment into readable illuminance data, and transmit the readable illuminance data to the master controller; the second sensor is configured to transmit a sensing signal to the master controller in a case where the second sensor senses that the user exists in a specified range; the master controller is configured to receive the readable illuminance data transmitted by the first sensor and/or the sensing signal transmitted by the second sensor, and adjust the output parameter of the drive apparatus in the illumination device to which the master controller belongs based on the readable illuminance data and/or the sensing signal to control an illumination brightness of the illumination unit controlled by the drive apparatus.

Optionally, the wireless master control apparatus is integrally provided in the illumination unit and the drive apparatus is provided separately from the illumination unit; or the wireless master control apparatus, the drive apparatus and the illumination unit are arranged separately.

According to another aspect of the present disclosure, an illumination control method is provided, which is adapted for an illumination control system provided with a plurality of illumination nodes capable of communicating with each other, wherein the illumination node comprises a wireless master control apparatus, and the method comprises:

detecting a brightness of a current environment in a case where the wireless master control apparatus in any illumination node in the illumination control system senses that a user exists in a specified range from the illumination node to which the wireless master control apparatus belongs;

defining an illumination scenario for the illumination node based on an environmental attribute of the illumination node, adjusting an illumination brightness of the illumination node according to the brightness and the illumination scenario currently defined for the illumination node, and sending a lighting instruction to a remaining illumination node of the illumination control system; and in a case where the wireless master control apparatus receives a lighting instruction sent by a remaining illumination node in the illumination control system to the illumination node to which the wireless master control apparatus belongs, adjusting the illumination brightness of the illumination node according to the lighting instruction.

Optionally, the method further comprises: in a case where the wireless master control apparatus receives a lighting instruction sent by a remaining illumination node in the illumination control system to an illumination node to which the wireless master control apparatus does not belong, forwarding the lighting instruction.

Optionally, the illumination control system further comprises a configurator which comprises a preset matrix diagram and is capable of being wirelessly connected with each illumination node in the illumination control system;

the method further comprises: identifying, by the configurator, an illumination region of the illumination control system, and dividing the illumination control system into a plurality of independent illumination subregions according to an actual region division after a deployment of each illumination node in the illumination control system is completed; selecting any one of the plurality of illumination subregions, establishing a communication connection with each illumination node in the any one of the plurality of illumination subregions respectively, deploying each illumination node into the preset matrix diagram according to an actual position of each illumination node, and generating a matrix coordinate for each illumination node for recording;

determining whether a matrix coordinate of each illumination node in the illumination subregion is correct or not, and in a case where the matrix coordinate of any illumination node in the any one of the plurality of illumination subregions is incorrect, reconfiguring a matrix coordinate for the any illumination node; and transmitting the matrix coordinate corresponding to each illumination node to each illumination node, after a configuration of the matrix coordinate of each illumination node is completed.

Optionally, the selecting any one of the plurality of illumination subregions, establishing the communication connection with each illumination node in the any one of the plurality of illumination subregions respectively, deploying each illumination node into the preset matrix diagram according to the actual position of each illumination node, and generating the matrix coordinate for each illumination node for recording comprise:

selecting any one of the plurality of illumination subregions, establishing a communication connection with any illumination node in the any one of the plurality of illumination subregions, and deploying the any illumination node into the preset matrix diagram as an origin of matrix coordinates; sequentially establishing a communication connection with other illumination nodes in the any one of the plurality of illumination subregions, deploying the other illumination nodes into the preset matrix diagram according to actual positions of the other illumination nodes, and generating and recording matrix coordinates for the other illumination nodes.

Optionally, the method further comprises:
generating a matrix diagram with each illumination node in the any one of the plurality of illumination subregions as a matrix element based on the matrix coordinate of each illumination node in the any one of the plurality of illumination subregions, in a case where the configuration of the matrix coordinate of each illumination node is completed; and transmitting the matrix diagram to each illumination node for storage by the wireless master control apparatus of each illumination node.

Optionally, after the matrix diagram is transmitted to each illumination node for storage by the wireless master control apparatus of each illumination node, the method further comprises:

setting one or more illumination scenarios for the illumination nodes in each illumination subregion based on an attribute function of each illumination subregion and preset scenario control parameters, and assigning a scenario number for each illumination scenario, wherein the scenario control parameters comprise a plurality of brightness levels for each illumination node and a duration of each brightness level.

Optionally, the scenario control parameters comprise:
a maximum brightness level, referring to a maximum brightness used in a case where a user exists within a specified range from the illumination node;

a maximum brightness holding time, referring to a holding time of the maximum brightness level in a case where the user exists;

a stable low-brightness level, referring to an illumination level which is kept no matter whether the user exists within the specified range from the illumination node or not;

a stable low-brightness holding time, referring to a maintaining time before a lamp is turned off completely; and/or a minimum brightness level, referring to a minimum brightness used in a case where the illumination node does not provide an illumination service.

Optionally, the wireless master control apparatus comprises a master controller, and a first sensor and a second sensor which are connected with the master controller;

detecting the brightness of the current environment in a case where the wireless master control apparatus in any illumination node in the illumination system senses that a user exists in a specified range from the illumination node to which the wireless master control apparatus belongs, adjusting an output parameter of a driver in the illumination node based on the brightness of the current environment, and controlling the illumination brightness of the illumination unit controlled by the driver comprise:

in a case where the second sensor in the wireless master control apparatus of any illumination node in the illumination system senses that a user exists in a specified range, transmitting a sensing signal to the master controller, sensing the brightness of the current environment by the first sensor, converting the brightness of the current environment into readable illuminance data, and transmitting the readable illuminance data to the master controller;

receiving, by the master controller, the readable illuminance data transmitted by the first sensor and/or the sensing signal transmitted by the second sensor, and adjusting the illumination brightness of the illumination node to which the master controller belongs based on the readable illuminance data and/or the sensing signal and the illumination scenario currently defined for the illumination node.

Optionally, subsequent to receiving, by the master controller, the readable illuminance data transmitted by the first sensor and/or the sensing signal transmitted by the second sensor, and adjusting the illumination brightness of the illumination node to which the master controller belongs based on the readable illuminance data and/or the sensing signal and the illumination scenario currently defined for the illumination node, the method further comprises:

sending a lighting instruction to a remaining illumination node of the illumination control system, wherein the lighting instruction carries the matrix coordinate of the illumination node to which the master controller belongs.

Optionally, the method further comprises:
in a case where the master controller receives a lighting instruction sent by a remaining illumination node, acquiring a matrix coordinate of the illumination node sending the lighting instruction;

in a case where the illumination node sending the lighting instruction and the illumination node to which the master controller belongs are determined to belong to a same illumination subregion, calculating a distance between the illumination node sending the lighting instruction and the illumination node to which the master controller belongs; and based on the distance and the illumination scenario currently defined for the illumination node to which the master controller belongs, calculating a required brightness level of the illumination node, and adjusting the illumination brightness of the illumination node to which the master controller belongs based on the brightness level.

Optionally, the method further comprises:
in a case where the master controller receives lighting instructions sent by a plurality of illumination nodes, obtaining matrix coordinates of the plurality of illumination nodes, calculating distances between the illumination nodes belonging to a same illumination subregion as the illumination node to which the master controller belongs and the illumination node to which the master controller belongs respectively, and ranking the calculated distances; and based on a shortest distance and the illumination scenario currently defined for the illumination node to which the master controller belongs, calculating a required brightness level of the illumination node, and adjusting the illumination brightness of the illumination node to which the master controller belongs based on the brightness level.

Optionally, the method further comprises:

in a case where no new lighting instruction is received after a duration of a current brightness level of the illumination node to which the master controller belongs reaches a preset time, controlling the illumination node to be switched to a next illumination brightness level required by the illumination scenario which is currently defined.

Optionally, the illumination control system further comprises a relay node which is wirelessly connected with each illumination node in the illumination control system;

the method further comprises: in a case where the relay node receives any lighting instruction, forwarding the lighting instruction; wherein the wireless master control apparatus serves as the relay node.

The present disclosure provides an illumination control system, an illumination control method and an illumination device. A wireless master control apparatus is provided in the illumination node of the illumination control system to sense the environment near the illumination node, and further adjust an illumination brightness of the illumination node to which the wireless master control apparatus belongs to the optimum illumination state based on the sensing result in combination with an illumination scenario currently defined by the illumination node, and send a lighting instruction to other illumination modes in the illumination control system. In addition, the wireless master control apparatus may further receive the lighting instruction sent by other illumination nodes, thereby further adjusting the illumination brightness of the illumination node to which the wireless master control apparatus belongs. The illumination control system and method according to the present disclosure have the following advantages: (1) power consumption is reduced, comfort level is improved: different regions being controlled separately, each illumination node being identified automatically, so that energy-saving and comfortable management is achieved; (2) each illumination node is simply arranged and configured variously; different regions, such as stairs, storage rooms and display areas, may be processed by using scenario modes which are easily adapted; (3) each illumination node is modularized, componentized and systematized; and products are all standardly configured, and scenario setting and system interaction are completed while a matrix is generated.

The above-mentioned description is merely a general description of the technical solutions of the present disclosure, and the present disclosure may be implemented in accordance with the content of the specification.

The above-mentioned and other objects, advantages and features of the present disclosure will become more apparent to those skilled in the art from the following detailed description of particular examples thereof in conjunction with the accompanying drawings.

In the description provided herein, numerous specific details are set forth. However, it is understood that examples of the disclosure may be implemented without these specific details. In some instances, well-known methods, structures and techniques have not been shown in detail in order not to obscure an understanding of this description.

Similarly, it should be appreciated that in the above description of exemplary examples of the disclosure, various features of the disclosure are sometimes grouped together in a single example, figure, or description thereof for the purpose of streamlining the disclosure and aiding in the understanding of one or more of the various inventive aspects.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Furthermore, while some examples described herein include some but not other features included in other examples, combinations of features of different examples are meant to be within the scope of the disclosure, and form different examples, as would be understood by those in the art.

It is to be noted that the above examples illustrate and does not limit the disclosure, and those skilled in the art may design alternative examples. The word "a" or "an" preceding an element does not exclude the presence of a plurality of such elements. The present disclosure may be implemented by means of a hardware comprising several different elements and by means of a suitably programmed computer. Some of the means may be embodied by the same hardware item. The use of the words first, second, and third, etc. does not mean any order. Such words may be construed as names.

Thus, it should be appreciated by those skilled in the art that while various exemplary examples of the present disclosure have been shown and described in detail herein, many other variations or modifications which are consistent with the principles of this present disclosure may be determined or derived directly from the disclosure of the present disclosure without departing from the spirit and scope of the present disclosure. Accordingly, the scope of the present disclosure should be understood and interpreted to cover all such other variations or modifications.

What is claimed is:

1. An illumination control system, comprising a plurality of illumination nodes which are capable of communicating with each other, wherein the illumination node comprises a wireless master control apparatus, a drive apparatus connected with the wireless master control apparatus, and at least one illumination unit controlled by the drive apparatus;

the wireless master control apparatus is configured to detect a brightness of a current environment in a case where the wireless master control apparatus senses that a user exists within a specified range from the illumination node to which the wireless master control apparatus belongs;

the wireless master control apparatus is further configured to:

define an illumination scenario for the illumination node to which the wireless master control apparatus belongs based on an environmental attribute of the illumination node;

adjust an output parameter of the drive apparatus in the illumination node according to the brightness and the illumination scenario currently defined for the illumination node to control an illumination brightness of the illumination unit; and send a lighting instruction to a remaining illumination node of the illumination control system;

the wireless master control apparatus is further configured to receive a lighting instruction sent by a remaining illumination node in the illumination control system to the illumination node to which the wireless master control apparatus belongs, and adjust an illumination brightness of the illumination node according to the lighting instruction; and a configurator which is provided with a preset matrix diagram and is capable of being wirelessly connected with each illumination node in the illumination control system;

wherein the configurator is configured to:

identify an illumination region of the illumination control system, and divide the illumination control system into a plurality of independent illumination subregions according to an actual region division after a deployment of each illumination node in the illumination control system is completed.

2. The illumination control system according to claim 1, wherein the wireless master control apparatus is further configured to receive and forward a lighting instruction which is sent by a remaining illumination node in the illumination control system to a illumination node to which the wireless master control apparatus does not belong.

3. The illumination control system according to claim 1, wherein the configurator is further configured to:

select any one of the plurality of illumination subregions, establish a communication connection with each illumination node in the any one of the plurality of illumination subregions, deploy each illumination node into the preset matrix diagram according to an actual position of each illumination node, and generate a matrix coordinate for each illumination node for recording;

determine whether a matrix coordinate of each illumination node in the any one of the plurality of illumination subregions is correct or not, and in a case where the matrix coordinate of any illumination node in the any one of the plurality of illumination subregions is incorrect, reconfigure a matrix coordinate for the any illumination node; and transmit the matrix coordinate corresponding to each illumination node to each illumination node after a configuration of the matrix coordinate of each illumination node is completed.

4. The illumination control system according to claim 3, wherein the configurator is further configured to:

select any one of the plurality of illumination subregions, establish a communication connection with any illumination node in the any one of the plurality of illumination subregions;

deploy the any illumination node into the preset matrix diagram as an origin of matrix coordinates;

sequentially establish a communication connection with other illumination nodes in the any one of the plurality of illumination subregions;

deploy the other illumination nodes into the preset matrix diagram according to actual positions of the other illumination nodes; and generate and record matrix coordinates for the other illumination nodes.

5. The illumination control system according to claim 3, wherein the configurator is further configured to:

generate a matrix diagram with each illumination node in the any one of the plurality of illumination subregions as a matrix element based on the matrix coordinate of each illumination node in the any one of the plurality of illumination subregions, after the configuration of the matrix coordinate of each illumination node is completed; and transmit the matrix diagram to each illumination node for storage by the wireless master control apparatus of each illumination node.

6. The illumination control system according to claim 5, wherein the configurator is further configured to:

set one or more illumination scenarios for the illumination nodes in each illumination subregion based on an attribute function of each illumination subregion and preset scenario control parameters, and assign a scenario number for each illumination scenario; wherein the scenario control parameters comprise a plurality of brightness levels for each illumination node and a duration of each brightness level.

7. The illumination control system according to claim 6, wherein the configurator is further configured to set one or more illumination scenarios for each illumination subregion according to at least one of following scenario control parameters:

a maximum brightness level, referring to a maximum brightness used in a case where a user exists within a specified range from the illumination node;

a maximum brightness holding time, referring to a holding time of the maximum brightness level in a case where the user exists;

a stable low-brightness level, referring to an illumination level which is kept no matter whether the user exists within the specified range from the illumination node or not;

a stable low-brightness holding time, referring to a maintaining time before a lamp is turned off completely; and a minimum brightness level, referring to a minimum brightness used in a case where the illumination node does not provide an illumination service.

8. The illumination control system according to claim 3, wherein the wireless master control apparatus comprises a master controller and a first sensor and a second sensor which are connected with the master controller;

the first sensor is configured to sense the brightness of the current environment, convert the brightness of the current environment into readable illuminance data, and transmit the readable illuminance data to the master controller;

the second sensor is configured to transmit a sensing signal to the master controller in a case where the second sensor senses that the user exists in the specified range; and the master controller is configured to receive the readable illuminance data transmitted by the first sensor and/or the sensing signal transmitted by the second sensor, adjust an output parameter of the drive apparatus in the illumination node to which the master controller belongs based on the readable illuminance data and/or the sensing signal and the illumination scenario defined currently for the illumination node, and control the illumination brightness of the illumination unit controlled by the drive apparatus.

9. The illumination control system according to claim 8, wherein the master controller is further configured to:
send a lighting instruction to a remaining illumination node of the illumination control system in a case where the master controller receives the sensing signal transmitted by the second sensor indicating that the user exists, wherein the lighting instruction carries the matrix coordinate of the illumination node to which the master controller belongs.

10. The illumination control system according to claim 9, wherein the master controller is further configured to:
after receiving a lighting instruction sent by a remaining illumination node, acquire a matrix coordinate of the illumination node sending the lighting instruction;
in a case where the illumination node sending the lighting instruction and the illumination node to which the master controller belongs is determined to belong to a same illumination subregion, calculate a distance between the illumination node sending the lighting instruction and the illumination node to which the master controller belongs; and
based on the distance and the illumination scenario currently defined for the illumination node to which the master controller belongs, calculate a required brightness level of the illumination node, adjust the output parameter of the drive apparatus in the wireless master control apparatus of the illumination node to which the master controller belongs based on the brightness level, and control the illumination brightness of the illumination unit controlled by the drive apparatus.

11. The illumination control system according to claim 9, wherein the master controller is further configured to:
in a case where the master controller receives lighting instructions sent by a plurality of illumination nodes, obtain matrix coordinates of the plurality of illumination nodes, calculate distances between the illumination nodes belonging to a same illumination subregion as the illumination node to which the master controller belongs and the illumination node to which the master controller belongs respectively, and rank the calculated distances; and
based on a shortest distance and the illumination scenario currently defined for the illumination node to which the master controller belongs, calculate a required brightness level of the illumination node, adjust the output parameter of the drive apparatus in the wireless master control apparatus of the illumination node to which the master controller belongs based on the brightness level, and control the illumination brightness of the illumination unit controlled by the drive apparatus.

12. The illumination control system according to claim 11, wherein the master controller is further configured to:
in a case where no new lighting instruction is received after a duration of a current brightness level of the illumination node to which the master controller belongs reaches a preset time, control the illumination node to be switched to a next illumination brightness level required by the illumination scenario which is currently defined.

13. The illumination control system according to any one of claim 1, further comprising:
a relay node which is wirelessly connected with each illumination node in the illumination control system, wherein the relay node is configured to forward the lighting instruction after receiving a lighting instruction sent by any illumination node; and the wireless master control apparatus serves as the relay node.

14. An illumination device, comprising a wireless master control apparatus, a drive apparatus connected with the wireless master control apparatus, at least one illumination unit controlled by the drive apparatus, and a configurator which is provided with a preset matrix diagram and is capable of being wirelessly connected with each illumination node in the illumination control system;
wherein the wireless master control apparatus is configured to adjust an output parameter of the drive apparatus in the illumination node to which the wireless master control apparatus belongs according to environment information within a specific range, and control an illumination brightness of the illumination unit controlled by the drive apparatus;
wherein the configurator is configured to identify an illumination region of the illumination control system, and divide the illumination control system into a plurality of independent illumination subregions according to an actual region division after a deployment of each illumination node in the illumination control system is completed.

15. The illumination device according to claim 14, wherein:
the wireless master control apparatus comprises a master controller, and a first sensor and a second sensor which are connected with the master controller;
the first sensor is configured to sense a brightness of a current environment, convert the brightness of the current environment into readable illuminance data, and transmit the readable illuminance data to the master controller;
the second sensor is configured to transmit a sensing signal to the master controller in a case where the second sensor senses that the user exists in a specified range; and
the master controller is configured to receive the readable illuminance data transmitted by the first sensor and/or the sensing signal transmitted by the second sensor, and adjust the output parameter of the drive apparatus in the illumination device to which the master controller belongs based on the readable illuminance data and/or the sensing signal to control an illumination brightness of the illumination unit controlled by the drive apparatus.

16. The illumination device according to claim 14, wherein
the wireless master control apparatus is integrally provided in the illumination unit and the drive apparatus is provided separately from the illumination unit; or
the wireless master control apparatus, the drive apparatus and the illumination unit are arranged separately.

17. An illumination control method adapted for an illumination control system provided with a plurality of illumination nodes capable of communicating with each other, wherein the illumination node comprises a wireless master control apparatus, and the method comprises:
detecting a brightness of a current environment in a case where the wireless master control apparatus in any illumination node in the illumination control system senses that a user exists in a specified range from the illumination node to which the wireless master control apparatus belongs;
defining an illumination scenario for the illumination node based on an environmental attribute of the illumination node, adjusting an illumination brightness of the illumination node according to the brightness and the illumination scenario currently defined for the illumination node, and sending a lighting instruction to a remaining illumination node of the illumination control system;

in a case where the wireless master control apparatus receives a lighting instruction sent by a remaining illumination node in the illumination control system to the illumination node to which the wireless master control apparatus belongs, adjusting the illumination brightness of the illumination node according to the lighting instruction; and providing a configurator for the illumination control system wherein the configurator comprises a preset matrix diagram and is capable of being wirelessly connected with each illumination node in the illumination control system;

identifying, by the configurator, an illumination region of the illumination control system, and dividing the illumination control system into a plurality of independent illumination subregions according to an actual region division after a deployment of each illumination node in the illumination control system is completed.

18. The method according to claim 17, further comprising: in a case where the wireless master control apparatus receives a lighting instruction sent by a remaining illumination node in the illumination control system to an illumination node to which the wireless master control apparatus does not belong, forwarding the lighting instruction.

19. The method according to claim 17, further comprising:

selecting any one of the plurality of illumination subregions, establishing a communication connection with each illumination node in the any one of the plurality of illumination subregions respectively, deploying each illumination node into the preset matrix diagram according to an actual position of each illumination node, and generating a matrix coordinate for each illumination node for recording;

determining whether a matrix coordinate of each illumination node in the illumination subregion is correct or not, and in a case where the matrix coordinate of any illumination node in the any one of the plurality of illumination subregions is incorrect, reconfiguring a matrix coordinate for the any illumination node; and transmitting the matrix coordinate corresponding to each illumination node to each illumination node, after a configuration of the matrix coordinate of each illumination node is completed.

20. The method according to claim 19, wherein selecting any one of the plurality of illumination subregions, establishing the communication connection with each illumination node in the any one of the plurality of illumination subregions respectively, deploying each illumination node into the preset matrix diagram according to the actual position of each illumination node, and generating the matrix coordinate for each illumination node for recording comprise:

selecting any one of the plurality of illumination subregions, establishing a communication connection with any illumination node in the any one of the plurality of illumination subregions, and deploying the any illumination node into the preset matrix diagram as an origin of matrix coordinates; and sequentially establishing a communication connection with other illumination nodes in the any one of the plurality of illumination subregions, deploying the other illumination nodes into the preset matrix diagram according to actual positions of the other illumination nodes, and generating and recording matrix coordinates for the other illumination nodes.

\* \* \* \* \*